US006744784B1

(12) United States Patent
Naka et al.

(10) Patent No.: US 6,744,784 B1
(45) Date of Patent: Jun. 1, 2004

(54) METHOD OF TRANSMITTING VARIABLE-LENGTH FRAME, TRANSMITTER, AND RECEIVER

(75) Inventors: Nobuhiko Naka, Yokohama (JP); Toshiro Kawahara, Yokosuka (JP)

(73) Assignee: NTT Mobile Communications Network Inc., Tokyo (JP)

( * ) Notice: Subject to any disclaimer, the term of this patent is extended or adjusted under 35 U.S.C. 154(b) by 0 days.

(21) Appl. No.: 09/214,445

(22) PCT Filed: May 15, 1998

(86) PCT No.: PCT/JP98/02141

§ 371 (c)(1),
(2), (4) Date: Dec. 29, 1998

(87) PCT Pub. No.: WO98/52315

PCT Pub. Date: Nov. 19, 1998

(30) Foreign Application Priority Data

May 16, 1997 (JP) .............................. 9-127608

(51) Int. Cl.⁷ .................................. H04J 3/00

(52) U.S. Cl. .................. 370/476; 370/503; 370/509

(58) Field of Search .................. 370/470, 509, 370/510, 503, 512, 476, 350; 375/354, 368, 262, 341, 342

(56) References Cited

U.S. PATENT DOCUMENTS

| | | | |
|---|---|---|---|
| 5,384,665 A | * 1/1995 | Ohkuma et al. | 360/22 |
| 5,557,479 A | * 9/1996 | Yanagihara | 360/32 |
| 5,600,672 A | * 2/1997 | Oshima et al. | 375/219 |
| 5,687,199 A | * 11/1997 | Dupuy | 375/354 |
| 5,896,374 A | * 4/1999 | Okumura et al. | 370/311 |
| 5,930,395 A | * 7/1999 | Nagai et al. | 382/232 |
| 6,108,384 A | * 8/2000 | Okumura et al. | 370/262 |

FOREIGN PATENT DOCUMENTS

KR 96-43648 A 12/1996

OTHER PUBLICATIONS

Sanae Hotani, Toshio Miki, "Study on Variable–Frame Synchronizing Method Suitable for MPEG–4 Audio", Technical Research Report of IEICE (Digital Signal Processing), vol. 96 No. 477 (DSP96–113), Jan. 23, 1997, pp. 35–42.

Nobuhiko Naka, Takashi Suzuki, Toshiro Kawahara, Toshio Miki, "Study on Protection of Variable–Frame Synchronization", Technical Research Report of IEICE (Radio Communication System), vol. 97 No. 193 (RCS97–50), Jul. 24, 1997, pp. 23–28.

* cited by examiner

*Primary Examiner*—Chi Pham
*Assistant Examiner*—Alexander O. Boakye
(74) *Attorney, Agent, or Firm*—Brinks Hofer Gilson & Lione

(57) ABSTRACT

A variable length frame transmission method making it possible to accurately and easily establish synchronism at the receiver side without redundancy of system under an environment in which a code error easily occurs.

In a transmitter, a variable length frame division section 1 divides a variable length frame f into code strings $f_1$ and $f_2$ having a length ratio of 1:1. A first synchronization flag addition section 3-1 adds a synchronization flag $S_1$ to the head of the code string $f_1$ and a second synchronization flag addition section 3-2 adds a synchronization flag $S_2$ to the head of the code string $f_2$. The synchronization flags have contents different from each other, but they have the same length. Code strings having synchronization flags are multiplexed by a changeover switch 4 and formed into a variable length frame. A series of variable length frames obtained from the changeover switch 4 are transmitted to a receiver as serial data. In the receiver, the start and end points of each frame is obtained based on the position of each synchronization flag in the serial data.

18 Claims, 14 Drawing Sheets

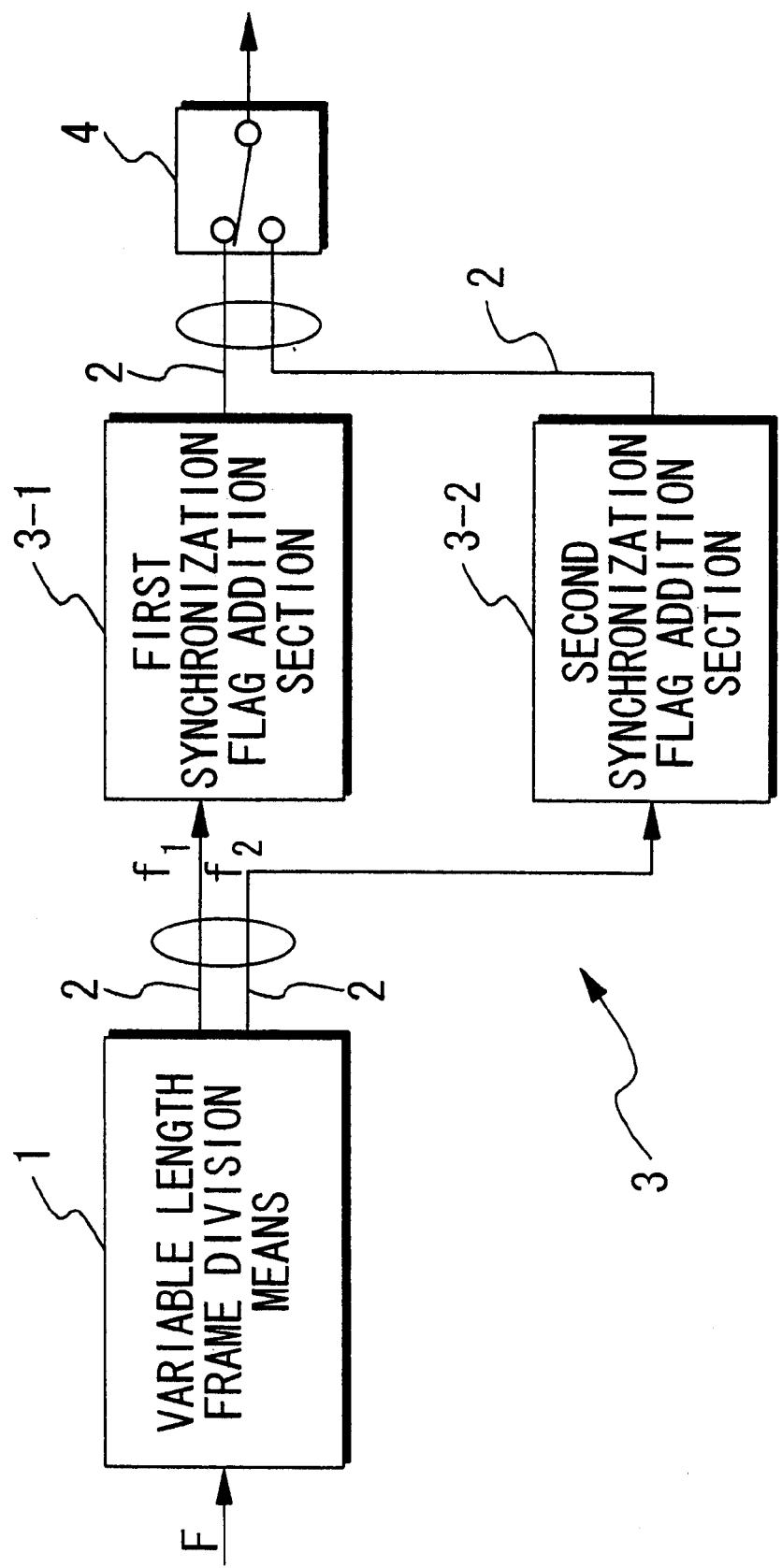

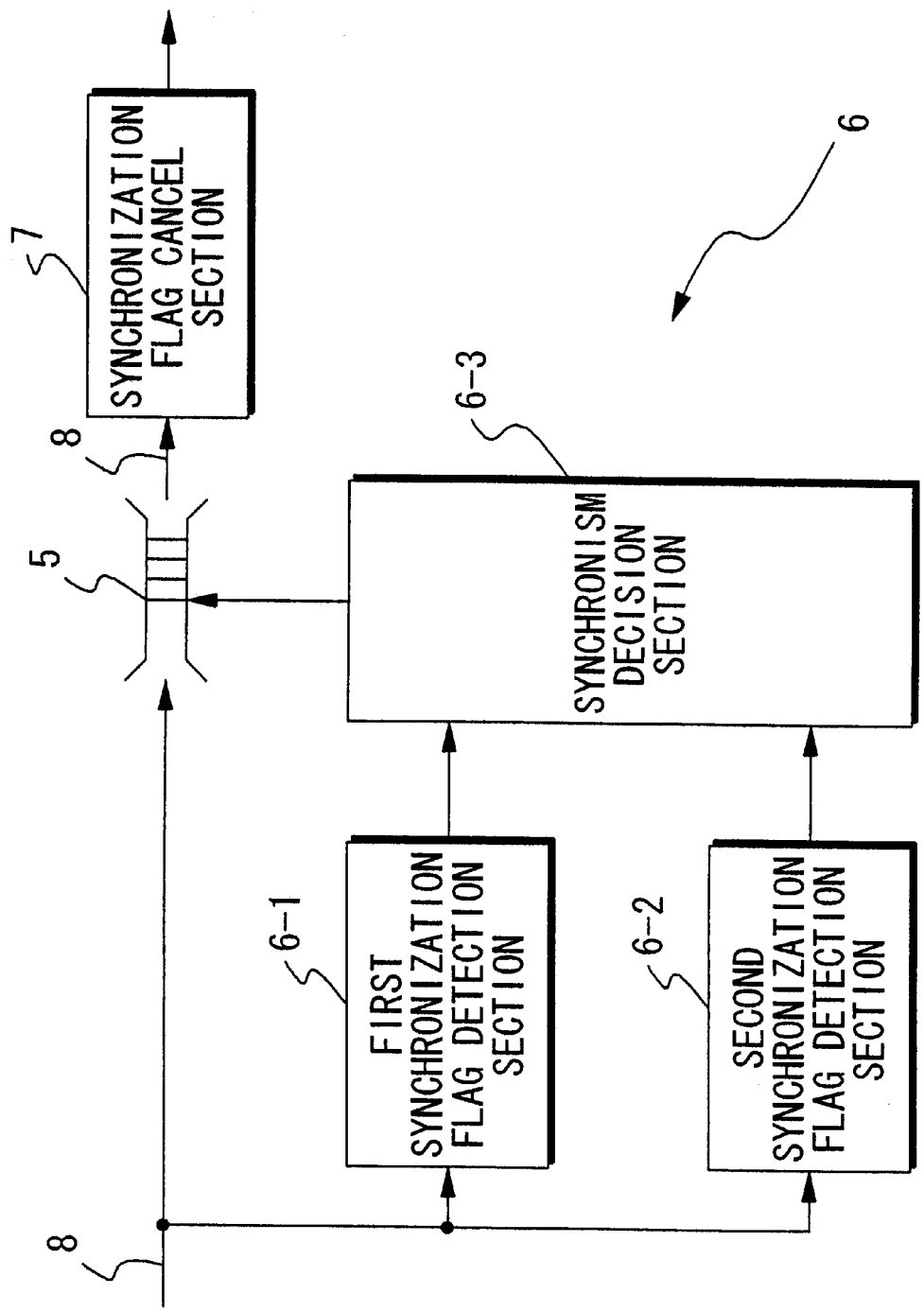

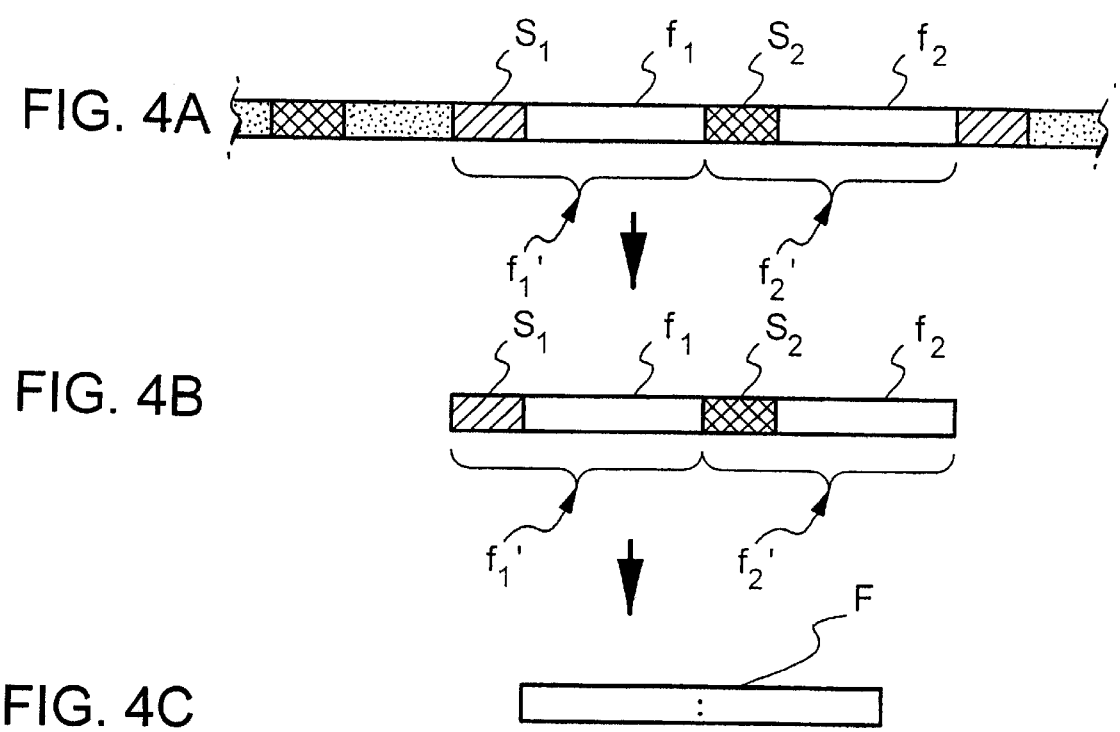

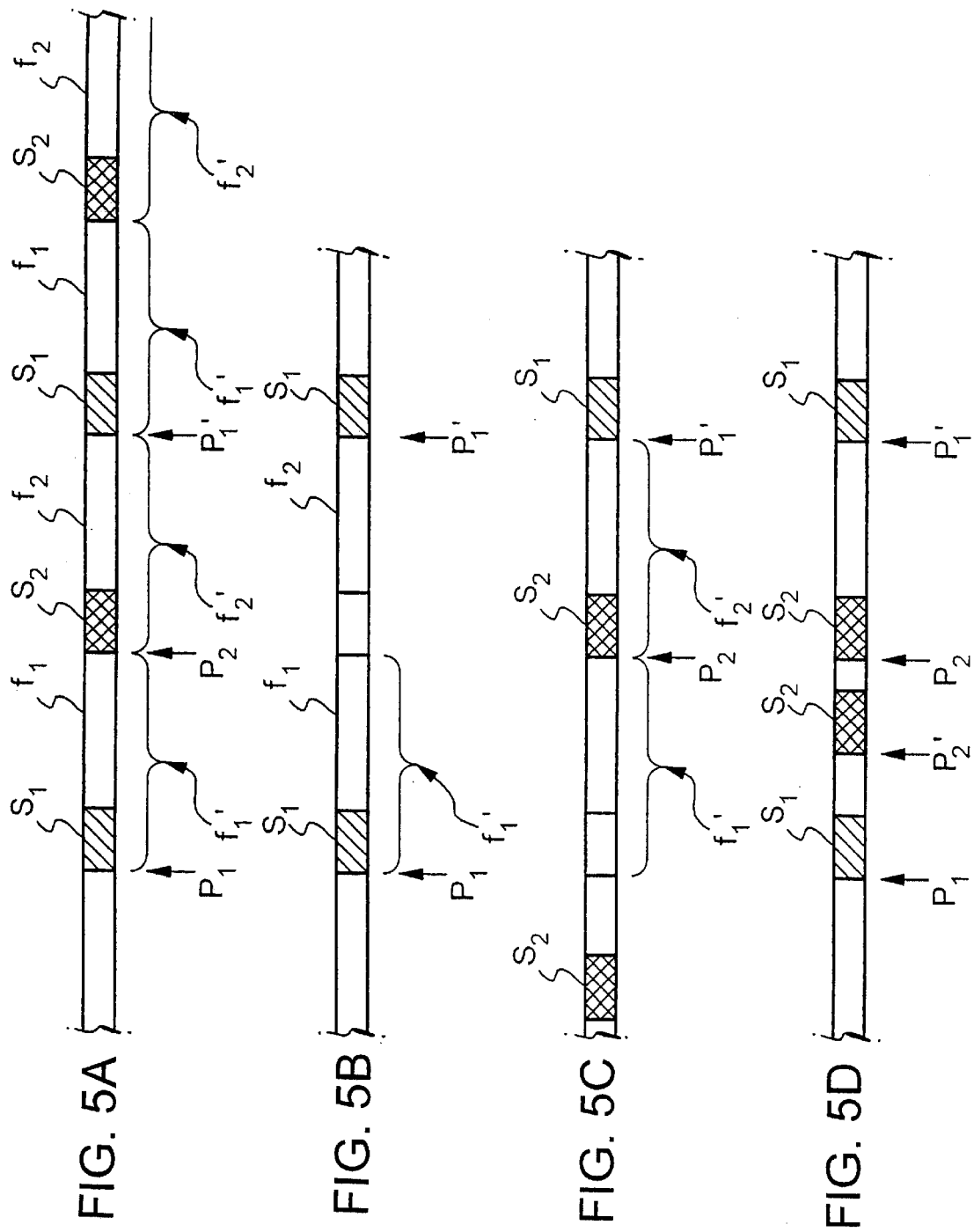

17: SYNCHRONISM ESTABLISHMENT SYSTEM

METHOD OF TRANSMITTING VARIABLE-LENGTH FRAME, TRANSMITTER, AND RECEIVER

TECHNICAL FIELD

The present invention relates to a variable length frame transmission method, a variable length frame transmitter, and a variable length frame receiver.

BACKGROUND ART

In multimedia communication, information constituted of variable length frames such as encoded picture and sound information or multiplexed information constituted of them is transmitted.

When transmitting variable length frames from a transmitter to a receiver, frames are inevitably received by a receiver at irregular time intervals. Therefore, the receiver determines the heading or trailing portions of frames in received signals and fetches frames out of received signals. This control method for receiving variable length frames is called frame synchronism establishment.

As this type of the conventional frame synchronization method, there are a fixed length frame synchronization method (pseudo length-fixing method) and a variable length frame synchronization method.

The fixed length frame synchronization method is a method for transmitting variable length frames by mapping them to fixed length frames. This method has an advantage that, once a receiver can secure synchronism, thereafter the receiver can predict positions of the start points of successively-incoming fixed length frames and maintain a synchronous state. In the case of this method, however, the data of original variable length frames are mapped to fixed length frames, and the fixed length frames are transmitted. Therefore, it is necessary to transmit fixed length frames including a pointer showing the boundary of variable length frames in the fixed length frames. Moreover, for the receiver to completely regenerate variable length frames, it is necessary to normally receive the pointer. Therefore, it is necessary to include an error correction code or the like for protecting the pointer from a code error in a fixed length frame. Therefore, there is a problem that a frame becomes redundant and the transmission efficiency is deteriorated. Moreover, because this method maps the information for variable length frames to fixed length frames, there is a problem that the flexibility of the entire system is deteriorated.

The variable length frame synchronization method is a synchronization method assuming that a variable length frame is directly transmitted without changing the variable length frame to pseudo fixed length.

A synchronization method using a synchronization flag is typical one of variable length frame synchronization methods. In this method, a transmitter adds a synchronization flag to the head of a variable length frame and transmits the variable length frame. A receiver detects a synchronization flag out of serial data received from the transmitter and then determines the position of a variable length frame following each synchronization flag. According to this type of the variable length frame synchronization method, variable length frames are directly transmitted. Therefore, problems do not occur that a frame becomes redundant and system flexibility is deteriorated.

As an example of the variable length frame synchronization method, there is the HDLC framing adapted to ITU-T Recommendation H. 223. In the HDLC framing, a receiver establishes synchronism by adding synchronization flag frame data of 01111110 to the head of each transmitted frame and transmitting the frame.

Moreover, data transmission for mobile communication is performed under a condition in which code errors frequently occur. When adding a synchronization flag to a frame and transmitting the frame under the above condition, a burst-like code error occurs during the transmission and the synchronization flag may be broken due to the code error. In this case, because a receiver cannot detect the synchronization flag, it cannot correctly receive the frame. This trouble is referred to as miss synchronization.

Furthermore, during transmission of a frame, data that does not originally serve as a synchronization flag may be changed to a synchronization flag. In this case, a receiver erroneously recognizes the data that is not a synchronization flag as a synchronization flag and handles the data following the erroneously-recognized synchronization flag as a frame. This trouble is referred to as wrong synchronization. Moreover, this type of the erroneous synchronism is caused by the fact that a code error occurs during transmission of a frame and moreover, it occurs when the data in a frame matches with a synchronization flag even for a case in which no code error occurs.

In this case, if no burst code error occurs during transmission but only random code errors occur, it is possible to prevent the above troubles to a certain extent. That is, it is possible to reduce the miss synchronization occurrence rate by using a method that a receiver decides the data having only bit errors in an allowable range in comparison with an actual synchronization flag as a synchronization flag. In the case of actual transmission, however, not only random code errors but also burst code errors frequently occur. Therefore, it is frequent to generate a code error exceeding the above allowable range as a synchronization flag during transmission. In this case, a receiver cannot establish synchronization.

As described above, the conventional variable length frame synchronization method using a synchronization flag has an advantage that a variable length frame can be directly transmitted but it has problems that miss synchronization or wrong synchronization easily occurs in a receiver due to a code error generated during transmission and it is difficult to normally regenerate a frame when the miss synchronization or wrong synchronization occurs.

Moreover, in the case of a variable length frame transmission system, it is generally and frequently performed to transmit the information concerned with the structure of a variable length frame by including the information in the variable length frame. This type of the information is very important information to regenerate the information superimposed on a variable length frame and it is requested to enhance the protection similarly to the case of a synchronization flag. However, a variable length frame transmission art meeting the above request is not provided yet.

DISCLOSURE OF INVENTION

The present invention is made to solve the above problems and its first object is to provide a variable length frame transmission method, a transmitter, and a receiver, capable of easily establishing synchronism at the receiver even under a condition in which code error easily occurs without deteriorating the flexibility and transmission efficiency of a system.

It is the second object of the present invention to provide a variable length frame transmission method, a transmitter, and a receiver, in which the information concerned with the structure of a variable length frame is protected when transmitting the information by including it in the variable length frame.

In a variable length frame transmission method of the present invention, a transmitter divides each variable length frame to be transmitted into a plurality of code strings according to a certain division rule, adds synchronization flags to the code strings, and transmits serial data constituted of a plurality of code strings and synchronization flags added to the code strings. A receiver receives the serial data, detects the synchronization flags from the serial data, decides start points of variable length frames in the serial data based on positions of at least two synchronization flags in the serial data, and fetches the variable length frame from the serial data.

Therefore, the present invention makes it possible to accurately and easily establish synchronism without causing a frame to be redundant even under a condition in which a code error easily occurs in a synchronization flag.

In another mode of the present invention, a transmitter transmits the serial data by arranging additional information including the information concerned with the structure of a variable length frame after each synchronization flag.

Therefore, this mode has an advantage that a receiver can easily obtain additional information because it is only necessary that any one of pieces of additional information following to each synchronization flag is normally transmitted.

In another mode of the present invention, a transmitter encodes the additional information including the information concerned with the structure of a variable length frame to generate identification code strings, and arranges the identification code strings after the synchronization flags to transmit the serial data, and a receiver detects the synchronization flags and the identification code strings from the serial data, compares the identification code strings detected together with the synchronization flags and thereby decides whether each synchronization flag is included in the same variable length frame.

According to the above mode, it is possible to decide whether or not synchronization flags before identification code strings are included in the same variable length frame. Therefore, it is possible to prevent an erroneous decision from being made on the start point of a frame.

BRIEF DESCRIPTION OF DRAWINGS

FIG. 1 is a block diagram showing the structure of the variable length frame transmitter of the first embodiment of the present invention;

FIG. 2 is a block diagram of the structure of the variable length frame receiver of the first embodiment;

FIGS. 4A to 4C are illustrations showing the steps of regenerating a variable length frame F in the receiver of the first embodiment;

FIGS. 5A to 5E are illustrations showing an algorithm for establishing the synchronism of a variable length frame F;

BEST MODE FOR CARRYING OUT THE INVENTION

Figure 3A:
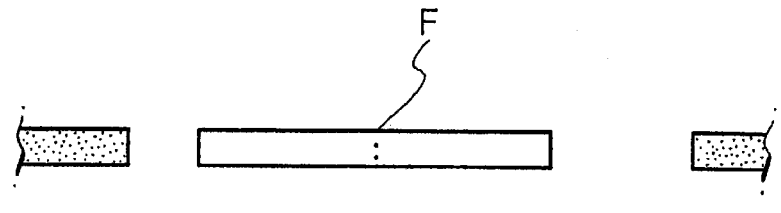
FIGS. 3A to 3D are illustrations showing the steps of processing a variable length frame F in the transmitter of the first embodiment.

The preferred embodiments of the present invention are described below.

A: First Embodiment (1) Structure of This Embodiment

FIG. 1 is a block diagram showing the structure of the variable length frame transmitter of the first embodiment of the present invention. The transmitter has variable length frame division means 1, addition means 3, and a changeover switch 4. Moreover, the addition means 3 is constituted with a first synchronization flag addition section 3-1 and a second synchronization flag addition section 3-2.

Variable length frames F are successively supplied to the variable length frame division means 1 from a not-illustrated high-order layer. When the variable length frame division means 1 receives a variable length frame F, it divides the variable length frame F into two code strings $f_1$ and $f_2$ having a length ratio of 1:1. Moreover, the variable length frame division means 1 outputs the code strings $f_1$ and $f_2$ to the addition means 3 through a transmission line 2.

The first synchronization flag addition section 3-1 of the addition means 3 adds a synchronization flag $S_1$ to the head of the code string $f_1$ and outputs a code string $f_1'$ obtained as the result to the changeover switch 4 through the transmission line 2. The second synchronization flag addition section 3-2 of the addition means 3 adds a synchronization flag $S_2$ to the head of the code string $f_2$ and outputs a code string $f_2'$ obtained as the result to the changeover switch 4 through the transmission line 2.

In this case, the synchronization flags $S_1$ and $S_2$ have contents different from each other. However, the synchronization flags $S_1$ and $S_2$ have the same length.

The changeover switch 4 is provided in the transmitter as output means for outputting serial data. The changeover switch 4 alternately selects the code string $f_1'$ output from the first synchronization flag addition section 3-1 and the code string $f_2'$ output from the second synchronization flag addition section 3-2 and outputs them to a not-illustrated transmission section. The transmission section successively receives synchronization flag-provided variable length frames respectively constituted with the code strings $f_1'$ and $f_2'$ through the changeover switch 4 and transmits serial data constituted with a series of these synchronization flag-provided variable length frames to a receiver.

FIG. 2 is a block diagram showing the structure of a receiver of this embodiment.

The receiver has a buffer 5, a synchronism establishment system 6, and a synchronization flag cancel section 7. Moreover, the synchronism establishment system 6 is constituted with a first synchronization flag detection section 6-1, a second synchronization flag detection section 6-2, and a synchronism decision section 603.

The serial data transmitted from the above transmitter is received by a not-illustrated reception section of the receiver. Then, the serial data is sent to the buffer 5, first synchronization flag detection section 6-1, and second synchronization flag detection section 6-2 through a transmission line 8.

The serial data received by the reception section is successively stored in the buffer 5. The serial data stored in the buffer 5 is read by the synchronism establishment system 6 and output to the synchronization flag cancel section 7.

The first synchronization flag detection section 6-1 is means for detecting a first synchronization flag $S_1$ included in the serial data. Moreover, the second synchronization flag detection section 6-2 is means for detecting a second synchronization flag $S_2$ included in the serial data.

The synchronism decision section 6-3 decides the address of each frame including a synchronization flag in the buffer 5 and reads frames from the buffer 5 in accordance with the decision result. The frame is constituted with code strings $f_1'$ and $f_2'$ respectively including a synchronization flag.

The synchronization flag cancel section 7 is means for canceling the synchronization flags $S_1$ and $S_2$ from the frame read out of the buffer 5 and reproducing an original variable length frame F.

(2) Operations of This Embodiment

<General Operations>

Then, operations of the transmitter are described below by referring to FIG. 1 and FIGS. 3A to 3D. FIGS. 3A to 3D are illustrations showing the process in which the variable length frame f is processed by a transmitter.

Figure 3B:
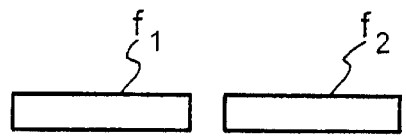

FIG. 3A shows one of a plurality of variable length frames to be continuously output from a not-illustrated high-order layer. The frame F is divided into the code string $f_1$ (front-half part) and the code string $f_2$ (rear-half part) having a length ratio of 1:1 in the variable length frame division section 1 as shown in FIG. 3B. The code strings are then output to the addition means 3.

Figure 3C:
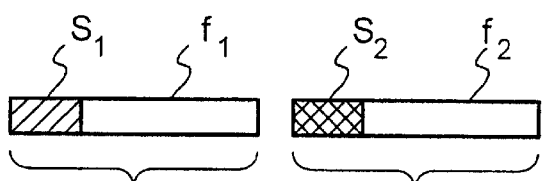

The first synchronization flag addition section 3-1, as shown in FIG. 3C, adds the synchronization flag $S_1$ to the head of the code string $f_1$ and outputs it to the changeover switch 4 as the code string $f_1'$. Moreover, the second synchronization flag addition section 3-2 adds the synchronization flag $S_2$ to the head of the code string $f_2$ and outputs it to the changeover switch 4 as the code string $f_2'$.

According to the switching operation of the above changeover switch 4, the code string $f_1'$ sent from the first synchronization flag addition section 3-1 and the code string $f_2'$ sent from the second synchronization flag addition section 3-2 are alternately selected. As a result, a frame constituted with the code strings $f_1'$ and $f_2'$ is output from the changeover switch 4 to a transmission section.

Figure 3D:
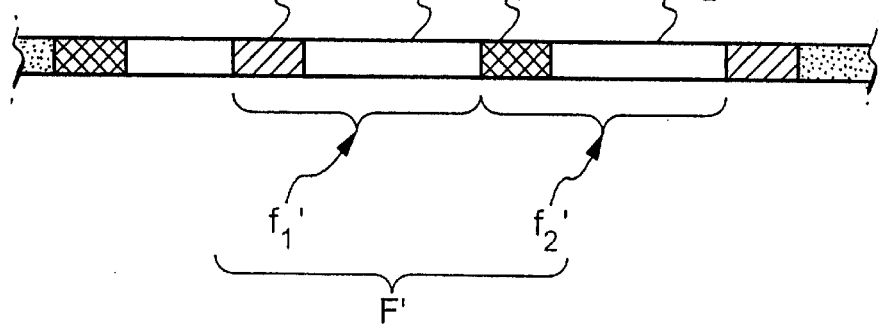

Hereafter, the same processing as the above is applied to a series of frames following the frame F. As a result, a series of variable length frames F' respectively corresponding to each variable length frame F are successively generated such as a frame F' corresponding to the frame F, a frame F' corresponding to the next frame F, and a frame F' corresponding to the further next frame F and supplied to the transmission section as a string of serial data. Moreover, as shown in FIG. 3D, the serial data is continuously transmitted to the receiver.

Then, operations of the receiver are described below by referring to FIG. 2 and FIGS. 4A to 4C. FIGS. 4A to 4C show the process in which an original variable length frame F is reproduced from serial data by the receiver.

Serial data transmitted from a transmitter is received by the receiver and successively stored in the buffer 5. The serial data is also input to the first synchronization flag detection section 6-1 and second synchronization flag detection section 6-2.

FIG. 4A illustrates the serial data received by the receiver. The serial data, as illustrated, includes a variable length frame constituted with the code strings $f_1'$ and $f_2'$.

When the first synchronization flag detection section 6-1 detects the synchronization flag $S_1$ out of the received serial data, it notifies the synchronization flag decision section 6-3 that the synchronization flag $S_1$ is detected. Moreover, when the second synchronization flag detection section 6-2 detects the synchronization flag $S_2$ out of the received serial data, it notifies the synchronism decision section 6-3 that the synchronization flag $S_2$ is detected.

The synchronism decision section 6-3 decides the positions of parts corresponding to the synchronization flags $S_1$ and $S_2$ out of the serial data in the buffer 5 in accordance with the notifications sent from the synchronism detection sections 6-1 and 6-2. That is, when the synchronization flag detection section 6-1 or 6-2 detects the synchronization flag $S_1$ or $S_2$, it notifies the synchronism decision section 6-3 that the synchronization flag $S_1$ or $S_2$ is detected and thereby, notifies the synchronism decision section 6-3 of the position of the synchronization flag $S_1$ or $S_2$ in the serial data in the buffer 5.

The synchronism decision means 6-3 performs the processing for establishing the synchronism of the variable length frame F in accordance with the detected positions of the synchronization flags $S_1$ and $S_2$ thus obtained. That is, the means 6-3 decides portions corresponding to the start and end points corresponding to the variable length frame F among a series of serial data stored in the buffer 5 and supplies the decision result (specifically, address in the buffer 5 corresponding to the start and end points) to the buffer 5. As a result, as shown in FIG. 4B, code strings in the section between the start point and the end point among a series of serial data are read out of the buffer 5 and output to the synchronization flag cancel section 7.

In the synchronization flag cancel section 7, the synchronization flags S1 and S2 are canceled from the code strings, and the variable length frame F is reproduced as shown in FIG. 4C and output.

<Synchronism Establishment Processing>

Then, the synchronism establishment processing of the variable length frame F performed by the synchronism decision section 603 is described below by referring to FIGS. 5A to 5D.

FIGS. 5A to 5D respectively show the serial data received by a receiver. The serial data is constituted with a plurality of variable length frames. However, the boundary between the variable length frames is unknown. Therefore, the synchronism decision section 6-3 of this embodiment decides the start and end points of a variable length frame as described below.

<1> When Both Synchronization Flags $S_1$ and $S_2$ are Normally Received

In the case of the example shown in FIG. 5A, when serial data is received, the synchronization flag $S_1$ is detected at a position $P_1$ in the serial data and then, the synchronization flag $S_2$ is detected at a position $P_2$.

In this case, the code strings $f_1$ and $f_2$ must be present after the synchronization flags $S_1$ and $S_2$ and these code strings $f_1$ and $f_2$ have a length ratio of 1:1.

Moreover, the synchronization flags $S_1$ and $S_2$ have the equal length.

Therefore, a frame start point (head of synchronization flag $S_1$) must be present at the position $P_1$ in the received serial data and the next frame start point (synchronization flag $S_1$ of the next frame) must be present at a position $P_1'$ which is advanced from the position $P_1$ by a length $2P_1P_2$ (that is, two times of difference between addresses $P_2$ and $P_1$).

Therefore, when the synchronization flags $S_1$ and $S_2$ are successively detected as shown in this example, the synchronism decision section 6-3 decides the position where the synchronization flag $S_1$ is present in the received serial data as the start point of a variable length frame and moreover, decides a position which is advanced from the start point by the length $2P_1P_2$ as the start point of the next variable length frame.

In this case, the synchronism decision section 6-3 can immediately determine the position of the start point of the next variable length frame without waiting for the synchronization flag $S_1$ of the next variable length frame to be detected.

<2> When Code Error Occurs in Synchronization Flag $S_2$

In the case of the example shown in FIG. 5B, a code error occurs in the synchronization flag $S_2$ in the process of transmitting serial data. Therefore, when the serial data is received by a receiver, the synchronization flag $S_1$ is detected at the position $P_1$ in the serial data and thereafter, the synchronization flag $S_1$ of the next frame is detected at the position $P_1'$ in the serial data though the synchronization flag $S_2$ is not detected.

In this case, because two synchronization flags $S_1$ are continuously detected, it is clear that the synchronization flag $S_2$ is not detected due to a code error. However, the two detected synchronization flags $S_1$ are the words which have been added to the heads of frames.

Therefore, as shown in this example, even if the synchronization flag $S_2$ is not detected, when the synchronization flag $S_1$ is detected, the synchronism decision section 6-3 decides that the start point of a frame is present at each point where the synchronization flag $S_1$ is detected in the serial data.

<3> When Code Error Occurs in Synchronization Flag $S_1$

In the case of the example shown in FIG. 5C, a code error occurs in the synchronization flag $S_1$ of a certain frame in the process of transmitting serial data. Therefore, when serial data is received by a receiver, the synchronization flag $S_2$ of a frame prior to the present frame is detected and thereafter, the synchronization flag $S_2$ of the present frame is detected at the position $P_2$ though the synchronization flag $S_1$ of the present frame is not detected and then, the position $P_1'$ of the synchronization flag $S_1$ of the next frame is detected at the position $P_1'$.

In this case, a length $P_2P_1'$ between the position $P_2$ where the synchronization flag $S_2$ of the present frame is detected and the position $P_1'$ where the synchronization flag $S_1$ of the next frame of the present frame is detected must be ½ of the length of the present frame.

Therefore, when the synchronization flag $S_2$ is detected though the synchronization flag $S_1$ is not detected as shown in this example and then, the synchronization flag $S_1$ of the next frame is detected, the synchronism decision section 6-3 decides a position which is backed from the detected position $P_1'$ of the synchronization flag $S_1$ by a length $2P_2P_1$ as the start position of a frame (that is, the position of the synchronization flag $S_1$ which must have been detected unless any code error occurred).

<4> When Data Not Synchronization Flag is Changed to Synchronization Flag Due to Code Error In the case of the example shown in FIG. 5D, data that is not the synchronization flag of a certain frame is changed to the synchronization flag $S_2$ due to a code error in the process of transmitting serial data. Therefore, when the serial data is received by a receiver, the synchronization flag $S_1$ of the frame is detected at the position $P_1$, then, the synchronization flag $S_2$ is detected at the position $P_2'$, then the synchronization flag $S_2$ is detected at the position $P_2$, and thereafter, the synchronization flag $S_1$ of the next frame is detected at the position $P_1'$.

In this case, only one synchronization flag $S_2$ should be included in one frame. Therefore, as shown in this example, when two synchronization flags $S_2$ are continuously detected, either $S_2$ is an imitation which has been produced due to a code error.

Moreover, in the case of this embodiment, the length of the part from the top of the synchronization flag $S_1$ to the top of the synchronization flag $S_2$ must be equal to the length of the part from the top of the synchronization flag $S_2$ to the end of the frame.

Therefore, in the case of this example, the synchronism decision section 6-3 decides that the synchronization flag $S_2$ detected at the position $P_2'$ is an imitation when, for example, $P_2P_1=P_1'P_2$ and $P_2'P_1 \neq P_1'P_2'$.

As described above, according to the synchronism establishment processing, if two out of three consecutive synchronization flags included in serial data can be detected, it is possible to decide the start and end points of a variable length frame.

<Example of Synchronism Establishment Processing Program>

The synchronism establishment processing of this embodiment are as described above. A person skilled in the art can optionally select whether to use hardware or software as means for executing the synchronism establishment processing. Moreover, to realize the synchronism establishment processing with, for example, software, a person skilled in the art can very easily prepare the software corresponding to the contents of synchronism establishment processing because the contents of the processing is already clarified in detail.

Figure 6:
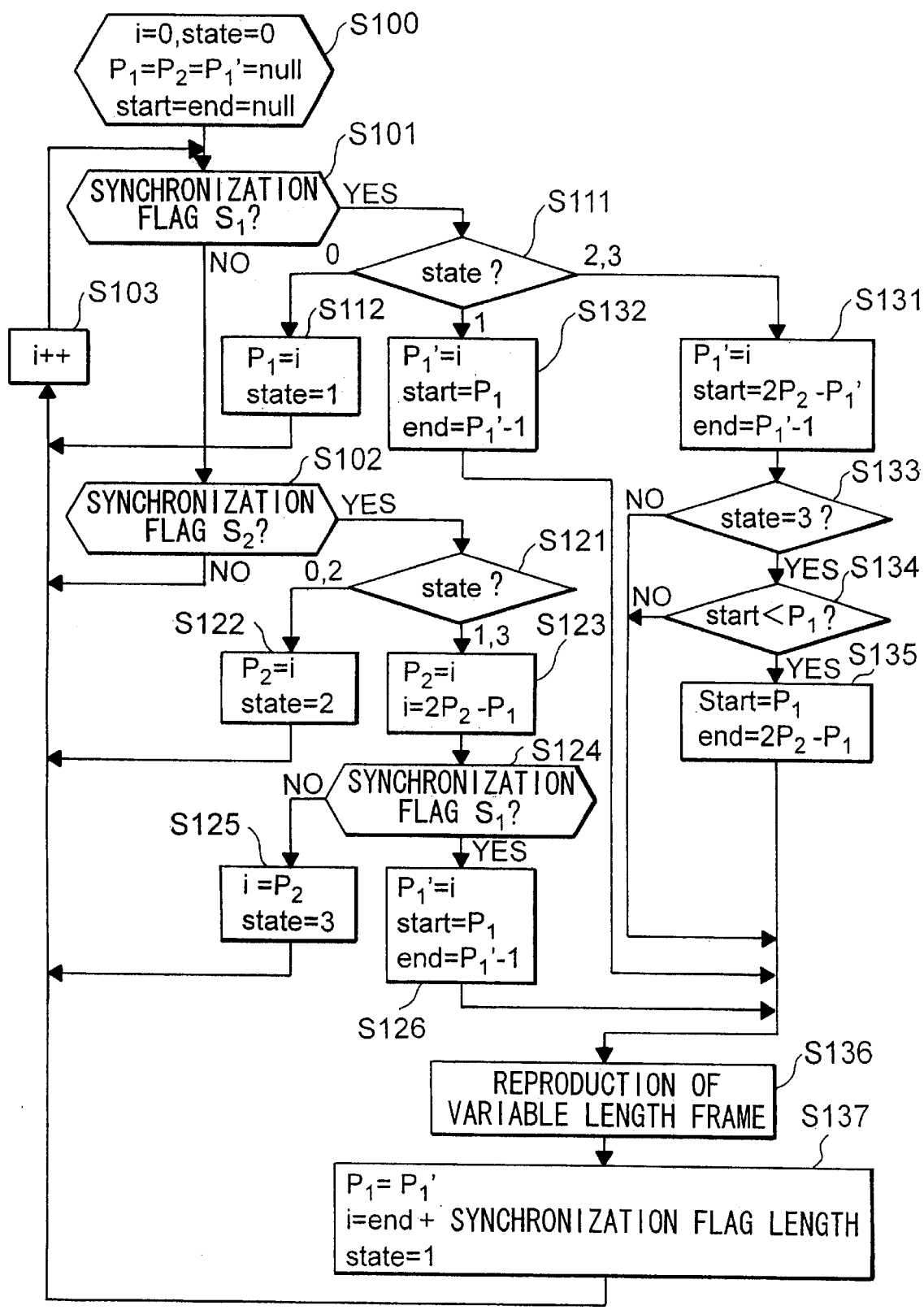
FIG. 6 is a flow chart showing a program for executing the synchronism establishment algorithm in FIG. 5.

FIG. 6 is a flow chart showing a program for executing the synchronism establishment processing. Moreover, many types of programs for executing the synchronism establishment processing can be considered in addition to the above program. However, a person skilled in the art can optionally select whether to use any program.

The program shown in FIG. 6 is executed by a processor such as DSP and corresponds to the synchronism detection sections 6-1 and 6-2 and the synchronism decision section 6-3 in FIG. 2.

In the case of the program, a processor determines the position of a variable length frame in the serial data stored in the buffer 5 by searching the serial data. To perform the above search, the program uses a pointer i, registers state, $P_1$, $P_2$, $P_3$, start and end. Moreover, it is possible to use resources in the processor or an exterior-type memory as the pointer and registers.

In this case, an address for reading data from the buffer 5 is stored in the pointer i.

The information showing the detected state of a synchronization flag is stored in the register state. More minutely, in the initial state in which the synchronization flag $S_1$ or $S_2$ is not detected at all, the state is set to "0". Moreover, when the synchronization flag $S_1$ is detected, the state is set to "1". Furthermore, when the synchronization flag $S_2$ is detected in the initial state, the states are set to "2". Furthermore, when the synchronization flag $S_1$ to be detected is not detected, the states are set to "3".

The registers $P_1$ and $P_2$ are registers for respectively storing the detected position of a synchronization flag. That is, when the synchronization flag $S_1$ is read out of the buffer 5, the read address is stored in the register $P_1$. When the synchronization flag $S_2$ is read out of the buffer 5, the read address is stored in the register $P_2$.

The register $P_1$ is means for storing the address of the start point of a frame when the start point (the position of the synchronization flag $S_1$) of a proceeding frame followed by the frame has been determined and the start point of the frame is detected or expected.

The registers start and end are registers for storing the addresses of the start and end points of a variable length frame when the start and end points are detected.

Then, specific states of FIGS. 5A to 5D are assumed to describe the flow of the program shown in FIG. 6 below.

First, assume a case as shown in FIG. 5A in which the synchronization flags $S_1$ and $S_2$ of a certain variable length frame are normally received and moreover, the synchronization flag $S_1$ of the next variable length frame is normally received. The flow of the processing by the program in the above case is described below.

First, when a processor starts the execution of the program, it executes initialization processing (step S100). In the initialization processing, "0" is set to the pointer i and the register state, and null information (vacant information having no content) is set to the registers $P_1$, $P_2'$, $P_1'$, start and end.

Then, the processor reads data from the address in the buffer 5 designated by the pointer i and decides whether or not the data is the synchronization flag $S_1$ (step S101). When the decision result is "NO", the processor decides whether or not the data is the synchronization flag $S_2$ (step S102). Moreover, when the decision result is "NO", the processor advances the pointer i by "1" (step S103) and then, returns to step S101. Thereafter, the processor repeats steps S101 to S103 until the synchronization flag $S_1$ or $S_2$ is detected.

Thereafter, when the synchronization flag $S_1$ (e.g. synchronization flag present at the leftmost in FIG. 5A) of the first variable length frame is read out of the buffer 5, the decision result in step S101 becomes "YES" and step S111 is started.

In step S111, a judgement is made with respect to the content of the register state. When the synchronization flag $S_1$ has been read in the initial state, the content of the register state is "0" in this step. Therefore, the routine proceeds to step S112. In this step S112, the processor stores the current data of the pointer i, that is, the address of the buffer 5 from which the synchronization flag $S_1$ has been read out in the register $P_1$, and sets "1" to the register state. Next, the processor repeats the search of the synchronization flags $S_1$ and $S_2$ (steps S101 and S102) incrementing the point i (step S103).

Thereafter, when the synchronization flag $S_2$ (e.g. second synchronization flag from the left in FIG. 5A) is read out of the buffer 5, the result of the judgement in step S102 becomes "YES" and the routine proceeds to step S121.

Next, in step S121, a judgement is made with respect to the content of the register state. In this case, the content of the register state is "1". Therefore, the routine proceeds to step S123 from step S121. In step S123, the processor stores the current data in the pointer i, that is, the address of the buffer 5 from which the synchronization flag $S_2$ has been read out in the register $P_2$. Moreover, $2P_2-P_1$, that is, $2(P_2-P_1)+P_1$ is computed and the computation result is set to the pointer i. An estimated address of the start point (the position of the synchronization flag $S_1$) of a frame following to the last frame having synchronization flags $S_1$ and $S_2$ which have already been detected, is determined by this computation, and the address thus determined is set to the pointer i. For example, in FIG. 5A, the synchronization flag $S_1$ of the variable length frame is present at the position $P_1'$ which is advanced from the position $P_1$ of the synchronization flag $S_1$ by two times as large as the length between the synchronization flags $S_1$ and $S_2$ of the last frame. The processing in step S123 is the processing for advancing the pointer i to the position $P_1'$.

Next, in step S124, the processor reads data from the addresses in the buffer 5 designated by the pointer i and judges whether or not the data is the synchronization flag $S_1$. When the result of the judgement is "YES", the routine proceeds to step S126.

In step S126, the processor stores the content of the pointer i indicating the address from which the synchronization flag $S_1$ in the register $P_1'$. Furthermore, the processor stores the content of the register $P_1$ indicating the address from which the previous synchronization flag $S_1$ prior to the present synchronization flag $S_1$ read out this time (the leftmost synchronization flag $S_1$ in the case of the example shown in FIG. 5A) in the register start. Furthermore, the processor subtracts 1 from the content of the register $P_1'$ and stores an address obtained by the subtraction in the register end.

When the processing in step S126 is completed, the routine proceeds to step S136. In step S136, the processor read a variable length frame out of a region between an address designated by the register start and an address designated by the register end (corresponding to the region between address P1 and an address which is different from address $P_1'$ by one in FIG. 5A) in the buffer 5 and send the variable length frame to the synchronization flag cancel section 7 in FIG. 2.

Next, the routine proceeds to step S137 in which the processor set the content of the register $P_1'$ to the register $P_1$, set a value obtained by adding the word length of a synchronization flag to the content of the register state to the pointer i, and set "1" to the register state. When step S137 is completed, the routine returns to step S101 via step S103. In this case, the pointer i designates the address following to the address of the last synchronization flag $S_1$. Therefore, steps S101 to S103 are repeated until the synchronization flag following to the last synchronization flag $S_1$ is read.

In the above description, a case in which the synchronization flag $S_1$ is initially read in the initial state is described as an example. However, there may be a case in which the synchronization flag $S_2$ is initially read. The operation corresponding to the case is as follows:

When the synchronization flag $S_2$ is initially read in the initial state, the result of the judgement in step S102 becomes "YES". The content of the register state is "0". Therefore, the routine proceeds to step S122 via step S121. In step S122, the processor stores the content of the pointer i which is stored in the pointer when the synchronization flag $S_2$ is read in the register $P_2$, and sets "2" to the register state. When the processing in step S122 is completed, the routine returns to step S101 via step S103. The processor then repeats search of the synchronization flags $S_1$ and $S_2$ incrementing the pointer i (steps S101 to S103).

Thereafter, when the synchronization flag $S_1$ is read, the result of the judgement in step S101 becomes "YES". Therefore, the routine proceeds to step S111. In step S111, a judgement is made with respect to the content of the register state. In this case, "2" is stored in the register state. Therefore, the routine proceeds to step S131 from step S111.

Next, in step S131, the processor reads data from the pointer i which is stored in the pointer when the last synchronization flag $S_1$ is read out, and sets the data thus read to the register $P_1{}'$. Furthermore, the processor determines an address $2(P_2-P_1{}')$ $(=P_1{}'-2(P_1{}'-P_2))$ which is backed from the address of the last synchronization flag $S_1$ by $2(P_1{}'-P_2)$, and stores the address thus determined in the register start. Furthermore, the processor subtracts 1 from the content of the register $P_1{}'$ to determine an address which has stored data prior to the last synchronization flag $S_1$, and stores the address thus determined in the register end. When the processing in step S131 is completed, the routine proceeds to step S133 in which a judgement is made as to whether or not the content of the register state is "3". In this case, "2" is stored in the register state. Therefore, the result of the judgement in step S133 is "NO". The processor then executes the processing in steps S136 and S137 described above. Next, the routine returns to step S101 via step S103.

According to the program described above, even if the synchronization flag $S_2$ is initially read in the initial state, it is possible to reproduce a variable length frame including the synchronization flag $S_2$. Moreover, in the flow described above, there is a case in which the synchronization flag $S_2$ is read and "2" is set to the register state and thereafter, not the synchronization flag $S_1$ but the synchronization flag $S_2$ is read. In this case, the content of the pointer i indicating the address of the last synchronization flag $S_2$ is set to the register $P_2$, "2" is set to the register state again, and the routine returns to step S101 via step S103. Then, the same processing as the above is executed.

Next, suppose a case in which the synchronization flag $S_1$ of a certain variable length frame is received and thereafter, the synchronization flag $S_1$ of the next variable length frame is received though the synchronization flag $S_2$ is not received as shown in FIG. 5B. The processing flow by the program in this case is as follows:

As already described, when the synchronization flag $S_1$ is read, the read address is stored in the register $P_1$ and "1" is set to the register state (step S122 or step S134). Then, the routine returns to step S101 via S103, and the processor repeats steps S101 to S103.

Thereafter, when the synchronization flag $S_1$ is detected though the synchronization flag $S_2$ is not read, the routine proceeds to step S132 via steps S101 and S111. In step S132, the processor obtains the content of the pointer i which is stored in the pointer when the last synchronization flag $S_1$ is read, and sets the content thus obtained to the register $P_1{}'$. Furthermore, the processor obtains the content of the register $P_1$, which indicates the address of the synchronization flag prior to the last synchronization flag $S_1$, and stores the address thus obtained in the register start. Furthermore, the processor subtracts "1" from the content of the register $P_1{}'$ to determine an address, and stores the address thus determined in the register end. When the processing in step S132 is completed, the routine proceeds to step S136 in which the processor reads a variable length frame from a region between an address designated by the register start and an address designated by the register end (corresponding to the region between $P_1$ and an address prior to $P_1{}'$ by one in FIG. 5B) in the buffer 5, and transmits the frame thus read to the synchronization flag cancel section 7 in FIG. 2.

Next, the processor executes step S137 already described and the routine returns to step S101 via step S103.

Thus, according to the present program, when the synchronization flag $S_1$ is read, and thereafter the synchronization flag $S_1$ is read though the synchronization flag $S_2$ is not read, the section between the top of the former synchronization flag $S_1$ and the top of the latter synchronization flag $S_1$ is reproduced as a variable length frame.

Next, suppose a case in which the synchronization flag $S_2$ is normally received, then the synchronization flag $S_1$ of a certain variable length frame having a code error is received, thereafter the synchronization flag $S_2$ of the same variable length frame is normally received, and finally the synchronization flag $S_1$ of the next variable length frame is normally received as shown in FIG. 5C. The processing flow by the present program in this case is as follows:

When the synchronization flag $S_2$ is read out of the buffer 5, the result of the judgement in step S102 becomes "YES", and the routine then proceeds to step S121 in which a judgement is made with respect to the content of the register state. When the synchronization flag $S_1$ is read before the above synchronization flag $S_2$, the address of the synchronization flag $S_1$ is stored in the register $P_1$ and "1" is stored in the register state (step S112 or S134). Therefore, in this case, the routine proceeds from step S121 to S123.

Next, in step S123, the processor sets the content of the pointer i indicating the address from which the synchronization flag $S_2$ is read to the register $P_2$. Furthermore, the processor computes $2P_2-P_1$ and sets an address obtained by the computation to the pointer i. The address set to the pointer i serves as the address of the synchronization flag $S_1$ which should be originally read after the leftmost synchronization flag $S_2$ is read, for example, as shown in FIG. 5C.

When the processing in step S123 is completed, the routine proceeds to step S124 in which the processor reads data from the address in the buffer 5 designated by the pointer i and judges whether or not the data thus read is the synchronization flag $S_1$.

If a code error occurs in the synchronization flag $S_1$ as shown in FIG. 5C, the result of the judgement in step S124 becomes "NO" and the routine proceeds to step S125.

Next, in step S125, the processor sets the content of the register $P_2$, that is, the address from which the last synchronization flag $S_2$ is read (address of the leftmost synchronization flag $S_2$ in FIG. 5C) to the pointer i and sets "3" to the register state. Next, the routine returns to step S101 via step S103.

Thereafter, when a new synchronization flag $S_2$ is detected, the routine proceeds to step S121 via step S102. In this case, "3" is stored in the register state. Therefore, the routine proceeds from step S121 to step S123.

Next, in step S123, the processor sets the content of the pointer i, that is, the address from which the synchronization flag $S_2$ is newly read to the pointer i. Furthermore, the processor computes $2P_2-P_1$ and sets an address obtained by the computation to the pointer i. When the processing in step S123 is completed, the routine proceeds to step S124 in which the processor reads data from the address in the buffer 5 designated by the pointer i and judges whether or not the data thus read is the synchronization flag $S_1$.

In this case, the data is not related to a synchronization flag, the result of the judgement in step S124 becomes "NO". The processor then sets the content of the register $P_2$ to the pointer i, and sets "3" to the register state (step S125), and the routine returns to step S101 via step S103.

Thereafter, when the synchronization flag $S_1$ of the next variable length frame (rightmost synchronization flag $S_1$ in FIG. 5C) is read, the routine proceeds to step S111 via step S103. In this case, "3" is stored in the register state. Therefore, the routine proceeds to step S131 from step S111.

In step S131, the processor sets the content of the pointer i to the register $P_1'$. Furthermore, the processor computes $2P_2-P_1'$ and stores the result of the computation in the register start. Furthermore, the processor subtracts "1" from the content of the register $P_1'$ and sets an address obtained by the subtraction to the register end.

Next, in step S133, a judgement is made as to whether or not the content of the register state is "3". In this case, the content of the register state is "3". Therefore, the result of the judgement in step S133 becomes "YES" and the routine proceeds to step S134.

Next, in step S134, a judgement is made as to whether or not the content of the register start is smaller than the content of the register $P_1$. In the case as shown in FIG. 5C, the address of the synchronization flag $S_1$ received before the leftmost synchronization flag $S_2$ is stored in the register $P_1$. Furthermore, an address which is different from the address $P_1'$ of the synchronization flag $S_1$ read at the present time (the rightmost synchronization flag $S_1$ shown in FIG. 5C) by two times of the difference between the address $P_1'$ of the present synchronization flag $S_1$ and the address $P_2$ of the synchronization flag $S_1$ read immediately after the address $P_1'$, that is, the address of the synchronization flag $S_1$ which has not been received is stored in the register start. Therefore, in the case of the example shown in FIG. 5C, the content of the register start is larger than $P_1$, and the result of the judgement in step S134 becomes "NO", and the routine proceeds to step S136.

Next, in step S136, the processor reads a variable length frame from the section of the buffer 5 designated by the address start and the address end which have been obtained by the processing in step S131, and sent the frame to the synchronization flag cancel section 7.

Next, in step S137, the processor sets the content of the register $P_1'$ to the register $P_1$, and sets an address obtained by adding the length of the synchronization flag to the content of the register end to the pointer i, and moreover sets "1" to the register state.

When the processing in step S137 is completed, the routine returns to step S101 via step S103.

As described above, according to the present program, even if the synchronization flag $S_1$ at the head of a certain variable length frame is not detected as illustrated in FIG. 5C, the frame is normally read out of the buffer 5 under the condition that the synchronization flag $S_2$ of the frame is normally detected and the synchronization flag $S_1$ at the head of the next frame of the frame is normally detected.

Furthermore, when code errors frequency occur, not only the synchronization flag $S_1$ at the head of a variable length frame but also the synchronization flag $S_2$ may not be detected (a case in which the second synchronization flag $S_2$ from the left in FIG. 5C is not detected). In this case, as described above, the routine proceeds to step S134 via steps S101, S111, S131 and S113 when the synchronization flag $S_1$ is detected. However, the result of the judgement in step S134 is different from the above mentioned.

That is, in this case, the address of the leftmost synchronization flag $S_2$ in the example in FIG. 5C is stored in the register $P_2$. Moreover, in step S131, an address which is different from the address of the new synchronization flag $S_1$ stored in the register $P_1'$ by two times the difference between the address in the register $P_2$ and the address in the register $P_1'$ is stored in the register start. Thus, the address stored in the register $P_1$ equals an address which is smaller than the address of the synchronization flag $S_1$ stored in the register $P_1$ (the address of the synchronization flag $S_1$ immediately before the leftmost synchronization flag $S_2$ in FIG. 5C). Therefore, the result of the judgement in step S134 is "YES" and the routine proceeds to step S135.

Next, in step S135, the content of the register $P_1$ is set to the register start and $2P_2-P_1$ is computed to set the operation result to the register end.

Next, in step S136, the processor reads a variable length frame from the section of the buffer 5 between the address start and the address end which have been obtained in step S135, that is, a variable length frame before the synchronization flag $S_1$ not detected in the example in FIG. 5C, and the processor sets the frame thus read to the synchronization flag cancel section 7.

Next, in step S137, the content of the register $P_1'$ is set to the register $P_1$, an address obtained by adding a synchronization flag length to the content of the register end to the pointer i, and moreover "1" is set to the register state.

When the processing in step S137 is completed, the routine returns to step S101 via step S103.

As described above, when not only the synchronization flag $S_1$ of a certain variable length frame but also the synchronization flag $S_2$ are not detected, a variable length frame before the synchronization flag $S_1$ is read out of the buffer 5.

Next, suppose a case in which the synchronization flag $S_1$ of a certain variable length frame is received and thereafter, two synchronization flags $S_2$ are consecutively received (but one of them is an imitation), and the synchronization flag $S_1$ of the next variable length frame is received as shown in FIG. 5D. The processing flow by the present program in this case is as follows:

As already described, when the synchronization flag $S_1$ is read and then the synchronization flag $S_2$ is read, the routine proceeds to step S123 via steps S102 and S121 of the present program.

In step S123, the processor sets the current data of the pointer i to the register $P_2$ and computes $2P_2-P_1$ to set the result of the computation to the pointer i.

In this case, the register $P_1$ stores the address of the synchronization flag $S_1$ prior to the synchronization flag $S_2$ read at present. Therefore, in step S123, the processor computes an address which is different from the address of the synchronization flag $S_1$ by two times as large as the difference between the address of the synchronization flag $S_1$ and that of the synchronization flag $S_2$ which is read at present, and the processor stores the address thus computed in the pointer i.

Next, in step S124, the processor reads data from the address in the buffer 5 designated by the pointer i, and judges whether or not the data thus read is the synchronization flag $S_1$.

In this case, when the synchronization flag $S_2$ read in step S102 is a synchronization flag $S_2$ normally transmitted, the result of the judgement in step S102 should be "YES". In this case, the processings in steps S126, S136, and S137 already described are performed, and then the routine returns to step S101 via step S103. That is, in this case, the synchronization flag $S_2$ after the synchronization flag $S_2$ read at present is ignored.

In contrast, when the synchronization flag $S_2$ read in step S102 is an imitation synchronization flag $S_2$ produced due to a code error, the result of the judgement in step S124 is "NO". In this case, the routine proceeds to step S125 to set the content of the register $P_2$ to the pointer i and set "3" to the register state. Then, the routine returns to step S101 via step S103.

Thereafter, when the synchronization flag $S_2$ is read again, the routine proceeds to step S123 via steps S102 and S121. Then, the content of the pointer i, that is, the address of a new synchronization flag $S_2$ is set to the register $P_2$ and $2P_2-P_1$ is computed to set the operation result to the pointer i.

Then, in step S124, the processor reads data from the address in the buffer 5 designated by the pointer I, and judges whether or not the data thus read is the synchronization flag $S_1$.

In this case, when the synchronization flag $S_2$ read in step S102 is a synchronization flag $S_2$ normally transmitted, the result of the judgement is "YES". Therefore, the processor executes the processing in steps S126, S136, and S137 already described, and then the routine returns to step S101 via step S103.

As described above, according to the present program, even if the synchronization flag $S_1$ is received and thereafter, plural synchronization flags $S_2$ are successively received due to a code error, the position of a variable length frame is determined based on the synchronization flag $S_1$ and a normal synchronization flag $S_2$, and the variable length frame is read out of the buffer 5.

(3) Modification of This Embodiment

In the case of the embodiment described above, a variable length frame F supplied from a high-order layer is divided at a length ratio of 1:1. However, the present invention is not restricted to the embodiment. It is possible to set the division ratio to any value.

For example, suppose a case in which a certain variable length frame is divided into two code strings having a length ratio of a:b, and synchronization flags $S_1$ and $S_2$ are respectively added to the code strings to generate two variable length codes so that the ratio between the length from the top of the synchronization flag $S_1$ to the top of the synchronization flag $S_2$ and the length from the top of the synchronization flag $S_2$ to the end of the variable length frame is a':b'.

In this case, the following decisions are made in the synchronism decision section 6-3 in the case of the above <1> to <4>.

<1> When Both Synchronization Flags $S_1$ and $S_2$ are Normally Received

When the synchronization flags $S_1$ and $S_2$ are detected at the positions $P_1$ and $P_2$, the synchronism decision section 6-3 decides the position $P_1$ where the synchronization flag $S_1$ is present in received serial data as the start point of a variable length frame and moreover, decides a position which is advanced from the position $P_1$ by $P_1P_2(a'+b')/a'$ as the start point of the next frame. In this case, a length ratio a':b' is an unknown length ratio for a receiver. However, the division ratio at which the original variable length frame F is divided in the transmitter side is known for the receiver and moreover, the length of each synchronization flag added to the divided code strings $f_1$ and $f_2$ are also known. Therefore, the synchronism decision section 6-3 in the receiver side can obtain the above length ratio a':b' in accordance with the length $P_1P_2$ of the data between the detected position $P_1$ of the synchronization flag $S_1$ and the detected position $P_2$ of the synchronization flag $S_2$.

<2> When Code Error Occurs in Synchronization Flag $S_2$

When the synchronization flag $S_1$ is detected at the position $P_1$ and thereafter, the synchronization flag $S_1$ is detected at the position $P_1'$ though the synchronization flag $S_2$ is not detected, the synchronism decision section 6-3 decides that the start point of a frame is present at the position $P_1$ where the first synchronization flag $S_1$ is detected and the start point of the next frame is present at the position $P_1'$ where the synchronization flag $S_1$ is next detected.

<3> When Code Error Occurs in Synchronization Flag $S_1$

When the synchronization flag $S_2$ is detected and then, the synchronization flag $S_2$ is detected at the position $P_2$ though the synchronization flag $S_1$ is not detected, and thereafter, the synchronization flag $S_1$ is detected at the position $P_1'$, the synchronism decision section 6-3 decides that a position which is backed from the detected position $P_1'$ of the synchronization flag $S_1$ by $P_2P_1'(a'+b')/b'$ is the start point of a frame (that is, position of the synchronization flag $S_1$ which should be detected if there is no code error).

<4> When Data Which is Not Synchronization Flag is Changed to Synchronization Flag Due to Code Error Suppose a case in which the synchronization flag $S_1$ is detected at the position $P_1$, then the synchronization flags $S_2$ are successively detected at the positions $P_2'$ and $P_2$, and thereafter the synchronization flag $S_1$ is detected at the position $P_1'$. In this case, the synchronism decision section 6-3 decides that the synchronization flag $S_2$ detected at the position $P_2'$ is as an imitation when, for example, $P_2P_1/a' = P_1'P_2/b'$ and $P_2'P_1/a' \neq P_1'P_2'/b'$.

B: Second Embodiment (1) Structure of This Embodiment

In this embodiment, a variable length frame F supplied from a high-order layer is divided into n (n is an integer of 3 or more) code strings $f_k$ (k=1, 2, 3, . . . , n) and synchronization flag $S_k$ (k=1, 2, 3, . . . , n) are added to the code strings. In this case, each synchronization flag $S_k$ is different from the other synchronization flags.

Figure 7:
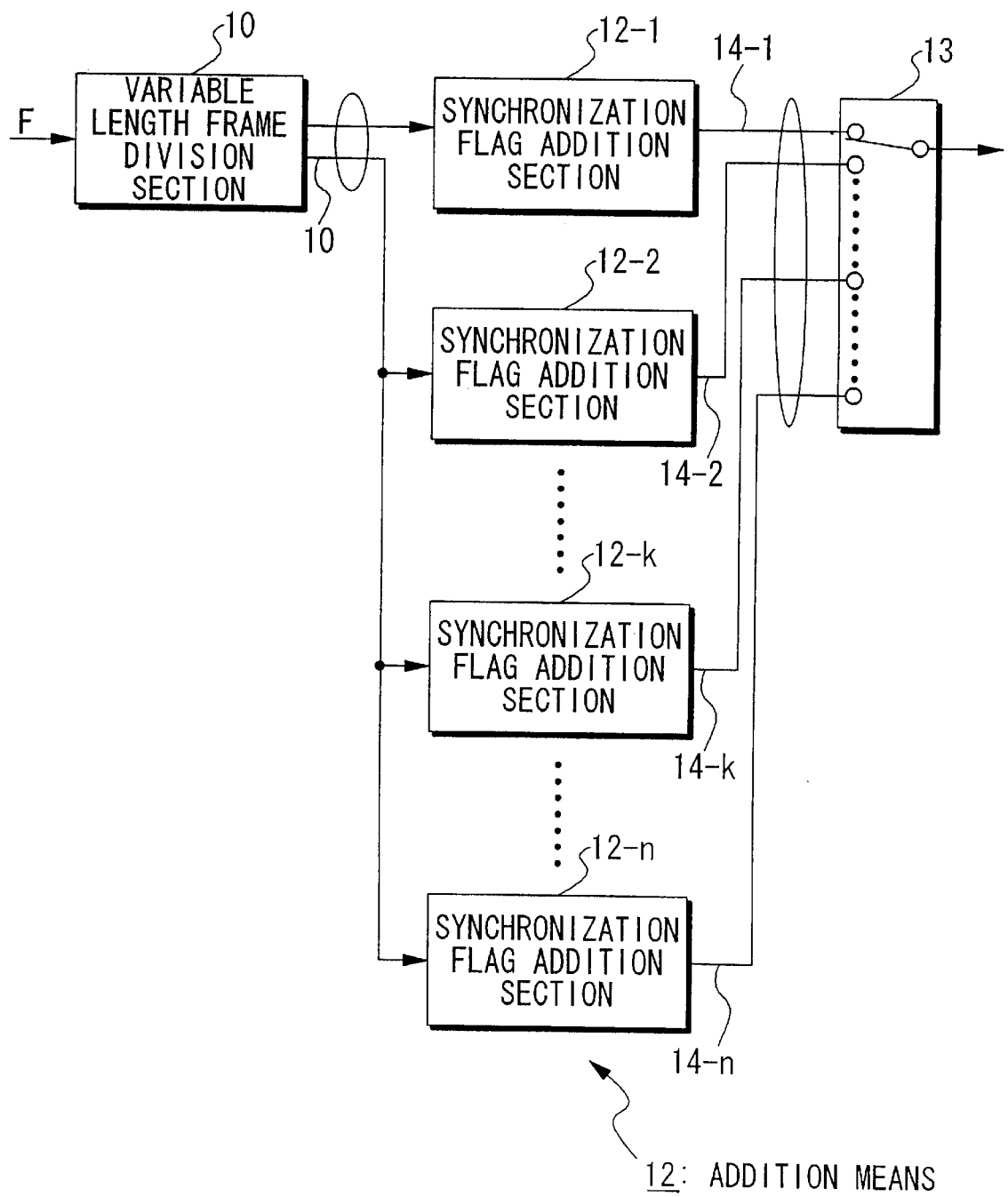
FIG. 7 is a block diagram showing the structure of the variable length frame transmitter of the second embodiment of the present invention.

FIG. 7 is a block diagram showing the structure of the transmitter of this embodiment. The transmitter has a variable length frame division section 10, addition means 12, and changeover switch 13. Moreover, the addition means 12 is constituted of n synchronization flag addition sections 12-1 to 12-n.

The variable length frame division section 10 divides a variable length frame supplied from a not-illustrated high-order layer into n code strings $f_k$ (k=1, 2, 3, . . . , n) and outputs them. These n code strings are input to the synchronization flag addition sections 12-1 to 12-n of addition means 12 from the variable length frame division section 10 through a transmission line 11.

Each synchronization flag addition section 12-k adds the synchronization flag $S_k$ to the head of the code string $f_k$ and outputs it to the changeover switch 13 through the transmission line 8.

The changeover switch 13 sequentially selects the signal output lines 14-1 to 14-n of the synchronization flag addition sections 12-1 to 12-n, and generates a variable length frame which is constituted of code strings (synchronization flag is added to head of each code string) output from the signal output lines each other on the time base, and outputs the variable length frame to a not-illustrated transmission section.

Figure 8:
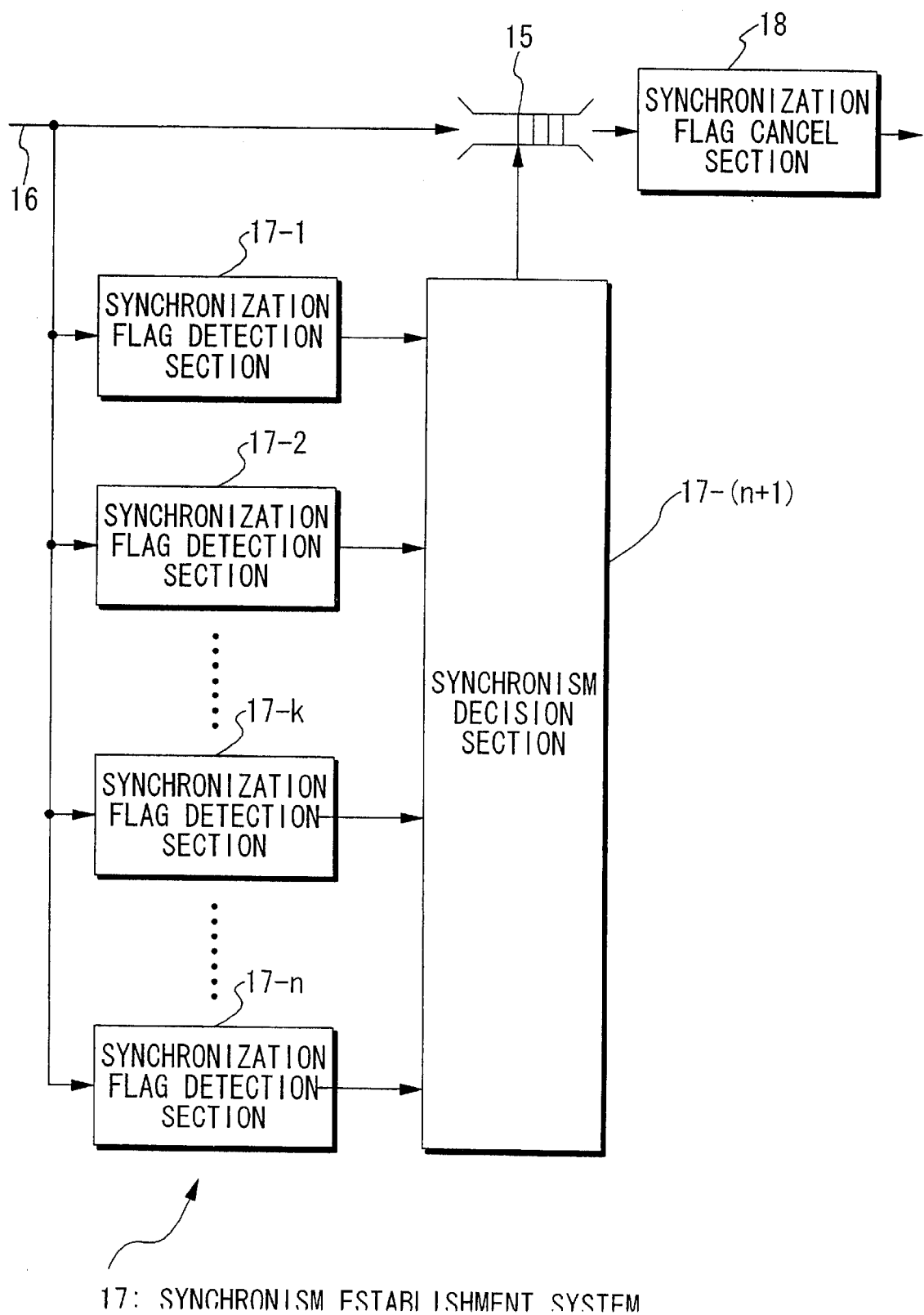
FIG. 8 is a block diagram showing the structure of thee variable length frame receiver of the second embodiment.

FIG. 8 is a block diagram showing the structure of the receiver of this embodiment. The receiver has a buffer 15, a synchronism establishment system 17, and a synchronization flag cancel section 18. Moreover, the synchronism establishment system 17 is constituted of n synchronization flag detection sections 17-1 to 17-n and synchronism decision means 17-(n+1).

Serial data transmitted from the above transmitter is received by the not-illustrated reception section of the receiver. Then, the serial data is sent to the buffer 15 and the n synchronization flag detection sections 17-1 to 17-n.

Figure 9:
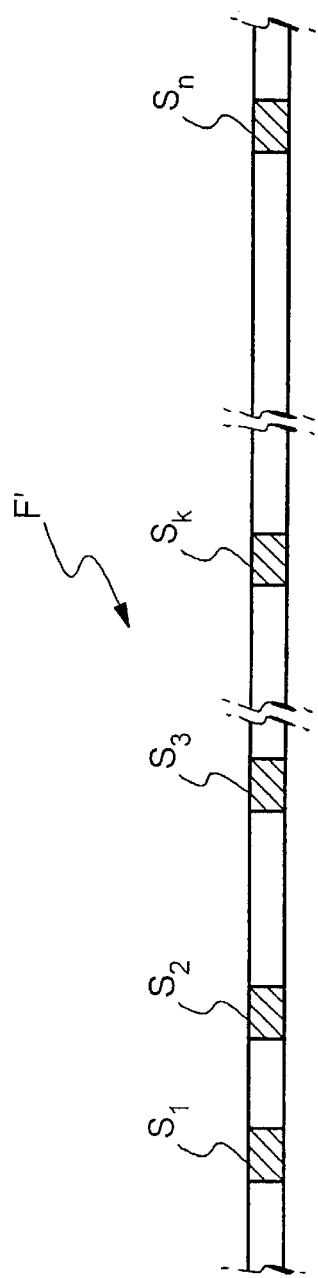
FIG. 9 is an illustration showing a variable length frame generated by the transmitter of the second embodiment.

The buffer 15 is storage means for storing the serial data sent from the transmitter. FIG. 9 illustrates serial data stored in the buffer 15. As shown in FIG. 9, the serial data includes a variable length frame F' to which synchronization flags $S_1$ to $S_n$ are added. Moreover, n code strings $f_1$ to $f_n$ obtained by dividing the original variable length frame follow the synchronization flags. The serial data stored in the buffer 15 is read by the synchronism establishment system 17 and output to the synchronization flag cancel section 18.

Each synchronization flag detection section 17-k (k=1 to n) is means for detecting each synchronization flag $S_k$ included in the serial data.

The synchronism decision section 17-(n+1) determines the address of the frame F' including these synchronization flags in the buffer 15 based on the decision result of n synchronization flag detection sections 17-1 to 17-n, and reads the frame F' out of the buffer 5 based on the address thus determined. The frame F' is constituted of code string $f_k$ (k =1 to n) which is obtained by dividing the original variable length frame and synchronization flag $S_k$ (k =1 to n) added to the heads of the code strings.

The synchronization flag cancel section 7 cancels the synchronization flag $S_k$ (k =1 to n) from the frame F' read out of the buffer 5 and reproduces the original variable length frame F.

(2) Operations of This Embodiment

Operations of this embodiment are described below.

In the transmitter, the variable length frame F supplied from a high-order layer is sent to the variable length frame division section 10 and divided into code strings $f_1$ to $f_n$ having, for example, length ratios $a_1: \ldots a_i: \ldots a_k: \ldots : a_n$ ($2 \leq i \leq n$, $a_i \neq a_k$). Then, synchronization flags $S_1$ to $S_n$ are added to the code strings $f_1$ to $f_n$ by the synchronization flag addition sections 12-1 to 12-n and code strings $f_1'$ to $f_n'$ are output. These codes strings $f_1'$ to $f_n'$ are multiplexed into a variable length frame F' by the changeover switch 13 and sent to a transmission section. The above operations are performed for each variable length frame F supplied from a high-order layer and serial data constituted with a series of variable length frames F' corresponding to the variable length frames F is transmitted through the transmission section.

The serial data is received by the reception section of the receiver and stored in the buffer 15. The synchronization flag detection sections 17-1 to 17-n detect the synchronization flags $S_1$ to $S_n$ from the received serial data.

The synchronism decision section 17-(n+1) decides start points of frames in the serial data in accordance with detected results of the synchronization flags $S_1$ to $S_n$.

More specifically, the synchronism decision section 17-(n+1) determines the start point of the variable length frame F' based on the detected positions of at least two synchronization flags $S_1$ and $S_k$ as described below.

First, the length ratios $a'_1: \ldots a'_i: a'_k: \ldots : a'_n$ ($2 \leq i < k \leq n$, $a'_i \neq a'_k$) of the code strings $f_1'$ to $f_n'$ output from the synchronization flag addition sections 12-1 to 12-n of the transmitter is unknown for the receiver. However, the division ratio $a_1: \ldots a_i: \ldots : a_k: \ldots : a_n$ for dividing the original variable length frame F at the transmitter side is known and the length of the synchronization flag added to each of the divided code strings $f_1$ to $f_n$ is also known. Moreover, at the receiver side, the number of synchronization flags present between these synchronization flags $S_i$ and $S_k$ is also known. Therefore, the synchronism decision section 17-(n+1) at the receiver side can obtain the above length ratio $a'_1: \ldots a'_i: \ldots :a'_k: \ldots :a'_n$ based on the length $P_iP_k$ of the data between the detected position $P_i$ of the synchronization flag $S_i$ and the detected position $P_k$ of the synchronization flag $S_k$.

Then, the synchronism decision section 17-(n+1) decides that the start point of a frame is present at the point which is backed from the point $P_i$ by the length $P_iP_k$ ($a'_1+ \ldots +a'_{i-1})/(a'_1+ \ldots a'_{k-1})$ and the start point of the next frame is present at the point which is advanced from the point $P_k$ by the length $P_iP_k$ ($a'_k+ \ldots +a'_n)/(a'_i+ \ldots +a'_{k-1})$ using with the length ratio $a'_1: \ldots a'_i: \ldots : a'_k: \ldots : a'_n$ thus obtained.

C: Third Embodiment (1) Structure and Operations of This Embodiment

A variable length frame includes important pieces of information such as designation of the address of a variable length frame F, logical channel number, and information for showing the structure of the entire variable length frame F.

These pieces of important information should be firmly protected from code errors compared to other information.

In the variable length frame transmission method of this embodiment, these pieces of important information as additional information is transmitted by arranging the important information immediately after each synchronization flag.

Figure 10:
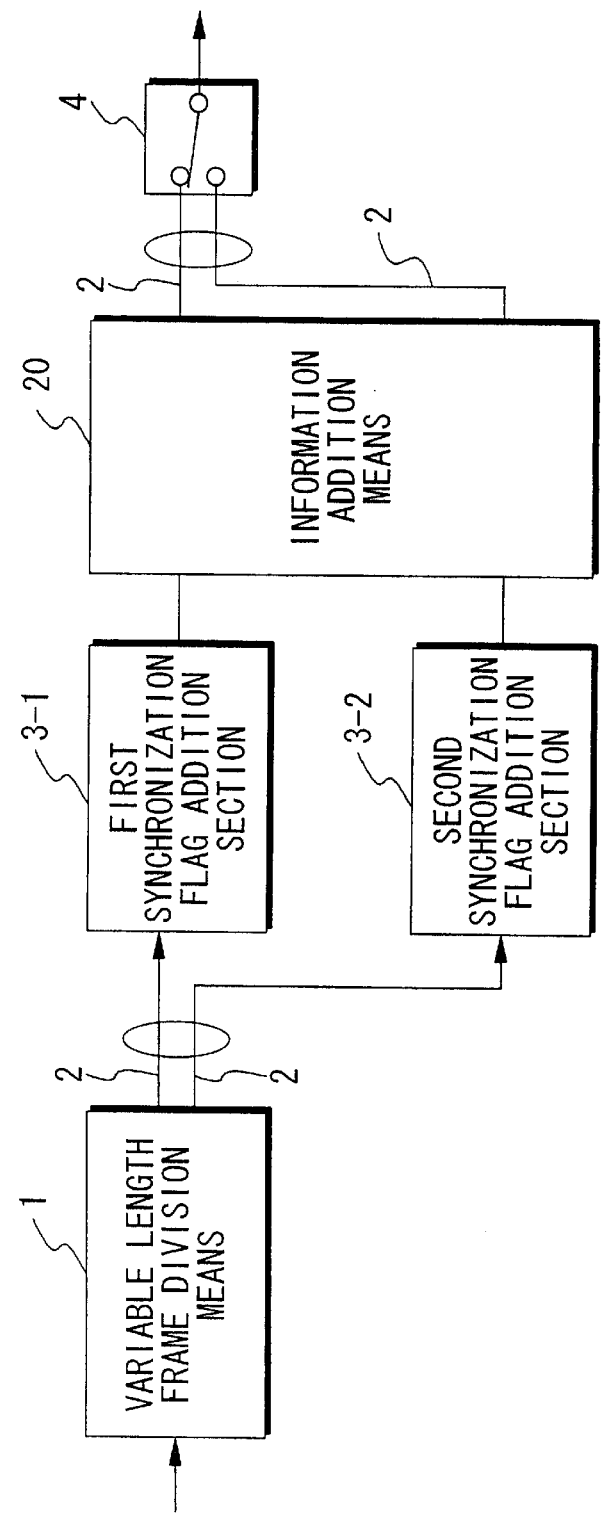
FIG. 10 is a block diagram showing the structure of the variable length frame transmitter of the third embodiment of the present invention.

FIG. 10 shows a structure of the transmitter of this embodiment. In the structure shown in FIG. 9, information addition means 20 is added to the first embodiment.

In FIG. 10, variable length frame division means 1 divides a variable length frame F supplied from a high-order layer into two code strings $f_1$ and $f_2$. First synchronization flag addition section 3-1 adds a synchronization flag $S_1$ to the head of the code string $f_1$ to output it as a code string $f_1'$. Second synchronization flag addition section 3-2 adds a synchronization flag $S_1$ to the head of the code string $f_2$ to output it as a code string $f_2'$.

The information addition means 20 adds additional information M supplied from not-illustrated information supply means to the code strings $f_1'$ and $f_2'$ obtained from the synchronization flag addition sections 3-1 and 3-2, and outputs code strings 1" and $f_2"$. More specifically, the information addition means 20 generates the code string f1" constituted by inserting the additional information M at a position immediately after the synchronization flag $S_1$ in the code string $f_1'$ and the code string $f_2"$ constituted by inserting the additional information M at a position immediately after the synchronization flag $S_2$ in the code string $f_2'$, and outputs them.

Changeover switch 4 then generates a variable length frame F' by multiplexing the code strings $f_1"$ and $f_2"$ thus generated and sends it to a not-illustrated transmission section.

The processing as described above is executed for each variable length frame F supplied from a high-order layer and a variable length frame F' corresponding to each variable length frame F is sent to the transmission section. Then, serial data constituted of a series of variable length frames F is transmitted to a receiver.

Figure 11:
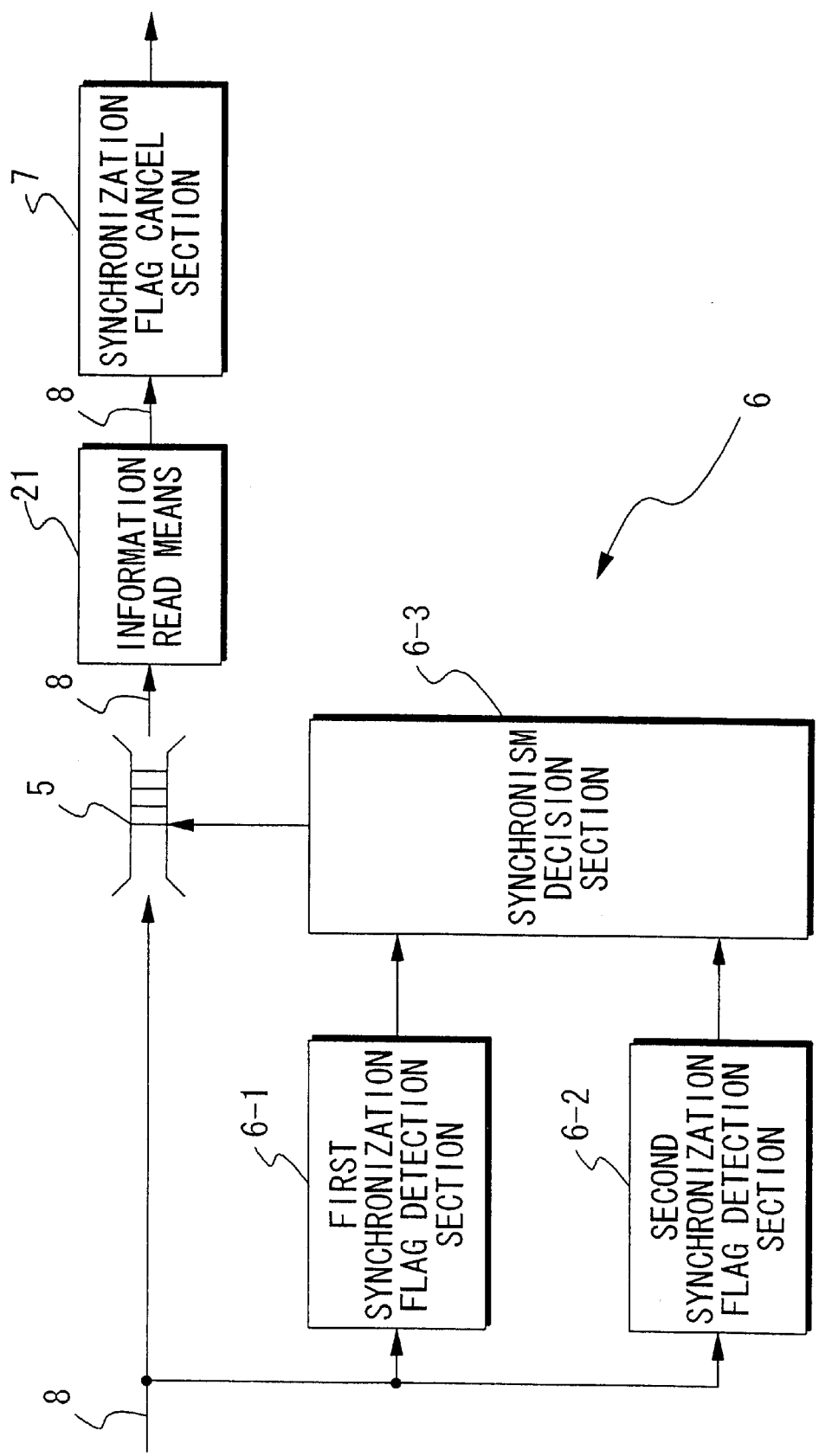
FIG. 11 is a block diagram showing the structure of the variable length frame receiver of the third embodiment.

FIG. 11 is a block diagram showing a structure of the receiver of this embodiment.

The receiver has information read means 21 between a buffer 5 and a synchronization flag cancel section 7.

Figure 12:
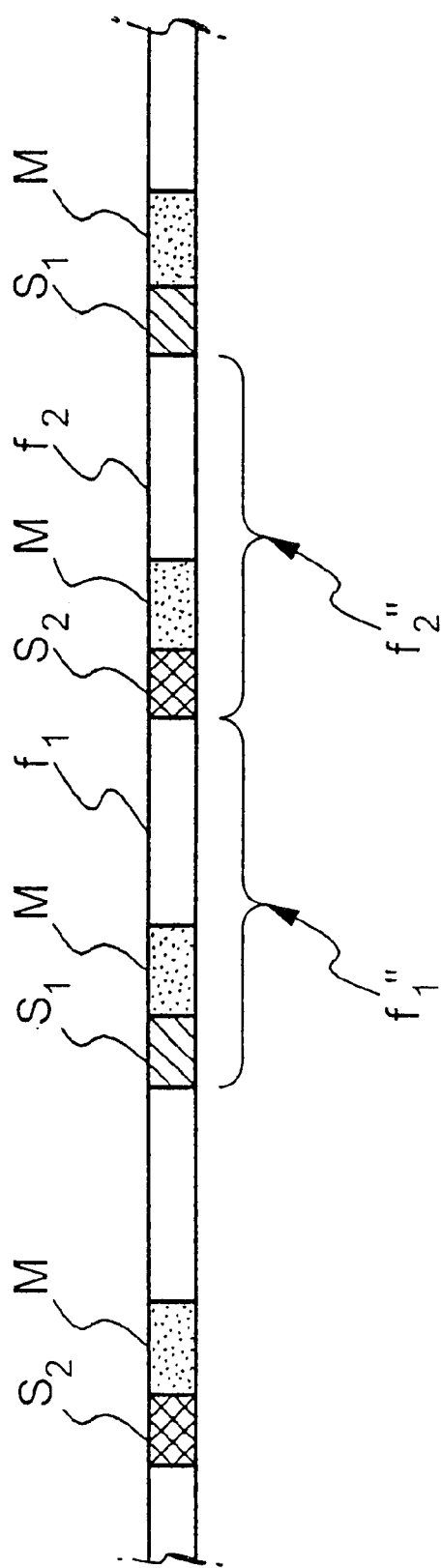
FIG. 12 is an illustration showing a variable length frame generated by the transmitter of the third embodiment.

The serial data transmitted from the transmitter is received by the reception section of the receiver and successively stored in the buffer 5. FIG. 12 illustrates the serial data stored in the buffer 5. As shown in FIG. 12, the serial data includes a lot of variable length frames F' constituted of the code strings $f_1"$ and $f_2"$ and the code strings $f_1"$ and $f_2"$ have the synchronization flags $S_1$ and $S_2$ at their heads. A synchronization flag decision section 6-3 determines the start point of each variable length frame F' based on the detected positions of these synchronization flags $S_1$ and $S_2$ and successively reads each variable length frame F' out of the buffer 5.

Thus, each variable length frame F' read out of the buffer 5 has the additional information M immediately after the synchronization flags $S_1$ and $S_2$.

When the information read means 21 receives the variable length frame F', it reads each piece of additional information M immediately after the synchronization flags $S_1$ and $S_2$ out of the variable length frame F'.

The additional information M immediately after the synchronization flag $S_1$ and the additional information M immediately after the synchronization flag $S_2$ have the same content. Therefore, as long as remaining additional information M is normal even if a code error occurs in either additional information M, it is possible for the receiver to use the important information included in the additional information M such as designation of the addresses of the variable length frames F, logical channel number, and information showing the structure of the whole variable length frame F.

(2) Modifications of This Embodiment

It is possible to modify this embodiment as shown below to embody it.

<1> In the above embodiment, the information addition means 20 is provided for the downstream-side output route of each synchronization flag addition section. However, it is possible to provide the information addition means 20 for the upstream side of each synchronization flag addition section and moreover functionally integrate the means 20 with each synchronization flag addition section.

<2> In the above embodiment, a structure is used in which the information addition means 20 and information read means 21 are added to the first embodiment. However, it is possible to add the information addition means 20 and information read means 21 to the second embodiment.

<3> The information read means 21 may be provided at any position as long as the position is located at the output side of the first synchronization flag detection section 6-1 or second synchronization flag detection section 6-2.

<4> The additional information M includes such information peculiar to each variable length frame as designation of the address of the variable length frame F and logical channel number. However, it is possible to include a CRC code and a BCH code for detecting errors in these pieces information in addition to these pieces of information.

To execute this modification, addition means for including a CRC code and a BCH code used for detecting errors in the additional information M is provided at the upstream side, downstream side, or inside of the information addition means 20.

Thus, it is possible for the receiver to confirm the validity of a synchronization flag detected by synchronization flag detection section 6-1 or 6-2 using with an error detection result of the additional information M immediately after the synchronization flag.

That is, when the receiver detects a synchronization flag out of serial data, it regards the data immediately after the synchronization flag as additional information including an error detection code and detects the error in the data. When an error is detected, the receiver decides that the data detected as a synchronization flag is not a synchronization flag.

As described above, according to this modification, it is possible to improve the synchronism establishment operation at the receiver side using with an error detection result of the additional information M for detection of a synchronization flag.

D: Fourth Embodiment (1) Structure of This Embodiment

Figure 13:
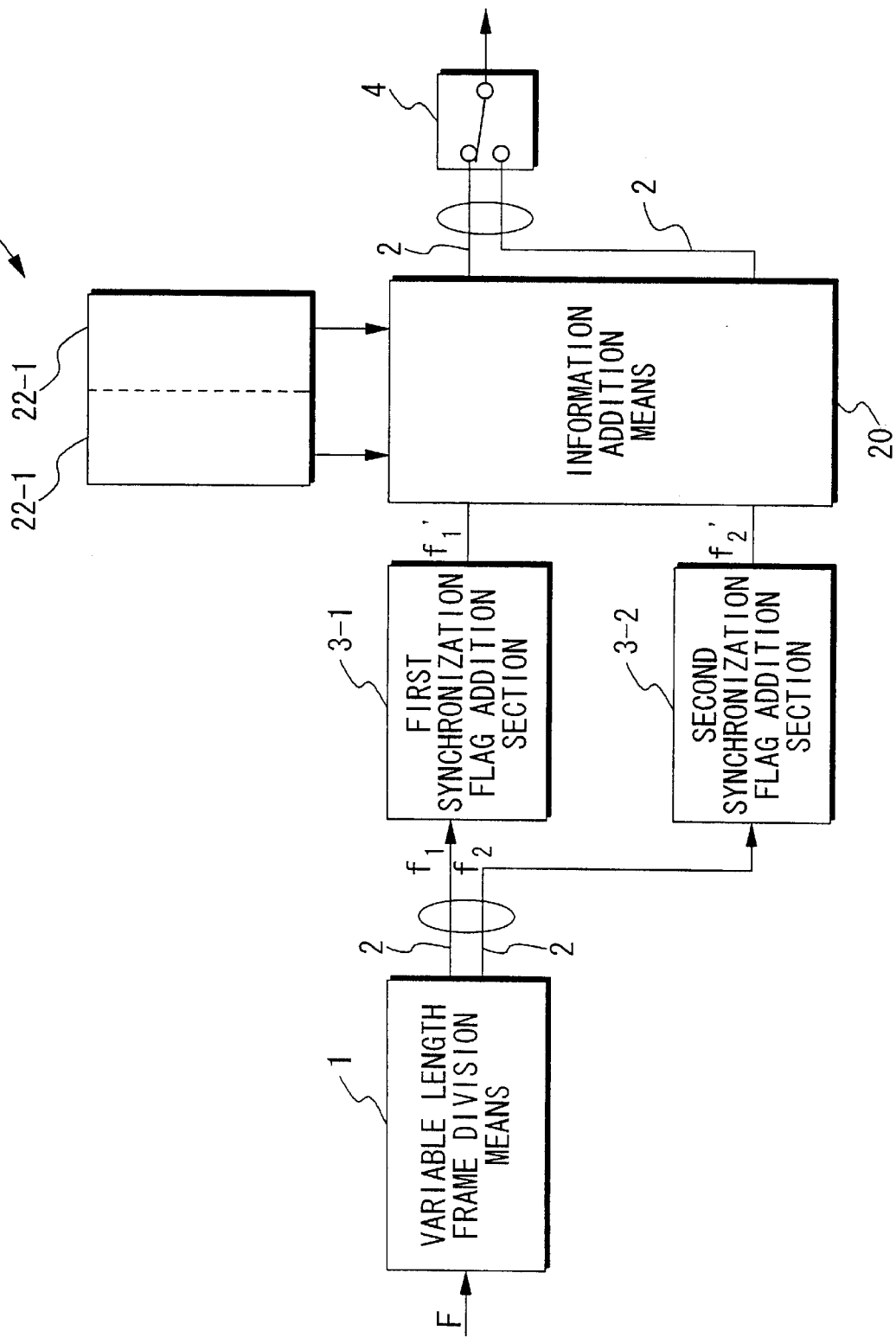
FIG. 13 is a block diagram showing the structure of the variable length frame transmitter of the fourth embodiment of the present invention.

FIG. 13 is a block diagram showing the structure of the transmitter of this embodiment. The transmitter is constituted by adding conversion means 22 to the transmitter of the third embodiment (FIG. 13).

The conversion means 22 is constituted of a first encoding section 22-1 and a second encoding section 22-2. The first encoding section 22-1 encodes additional information M supplied from a not-illustrated information supply means to generate an identification code string $E_1$. The second encoding section 22-2 encodes the additional information M in accordance with an encoding method different from that of the first encoding section 22-1 to generate an identification code string $E_2$. In this example, a bit "0" is added to the head of the additional information M to generate the identification code string $E_1$ and a bit "1" is added to the head of the additional information M to generate the identification code string $E_1$.

Furthermore, the encoding sections 22-1 and 22-2 alternately operate. For example, suppose a case in which code strings f1' and f2' corresponding to a certain variable length frame are output from synchronization flag addition sections 3-1 and 3-2 and thereby, for example, the encoding section 22-1 operates to output the identification code string $E_1$. In this case, the encoding section 22-2 operates to output the identification code string $E_2$ when each code string corresponding to a variable length frame next to the former variable length frame is output.

The identification code string $E_1$ or $E_2$ generated by the encoding section 22-1 or 22-2 is supplied to the information addition section 20. The information addition section 20 adds the identification code string $E_1$ or $E_2$ to the code strings $f_1'$ and $f_2'$ obtained from the synchronization flag additions sections 3-1 and 3-2. A position at which an identification code string is added is the position immediately after the synchronization flag $S_1$ or $S_2$ in each code string similarly to the case of the additional information M in the third embodiment.

Figure 14:
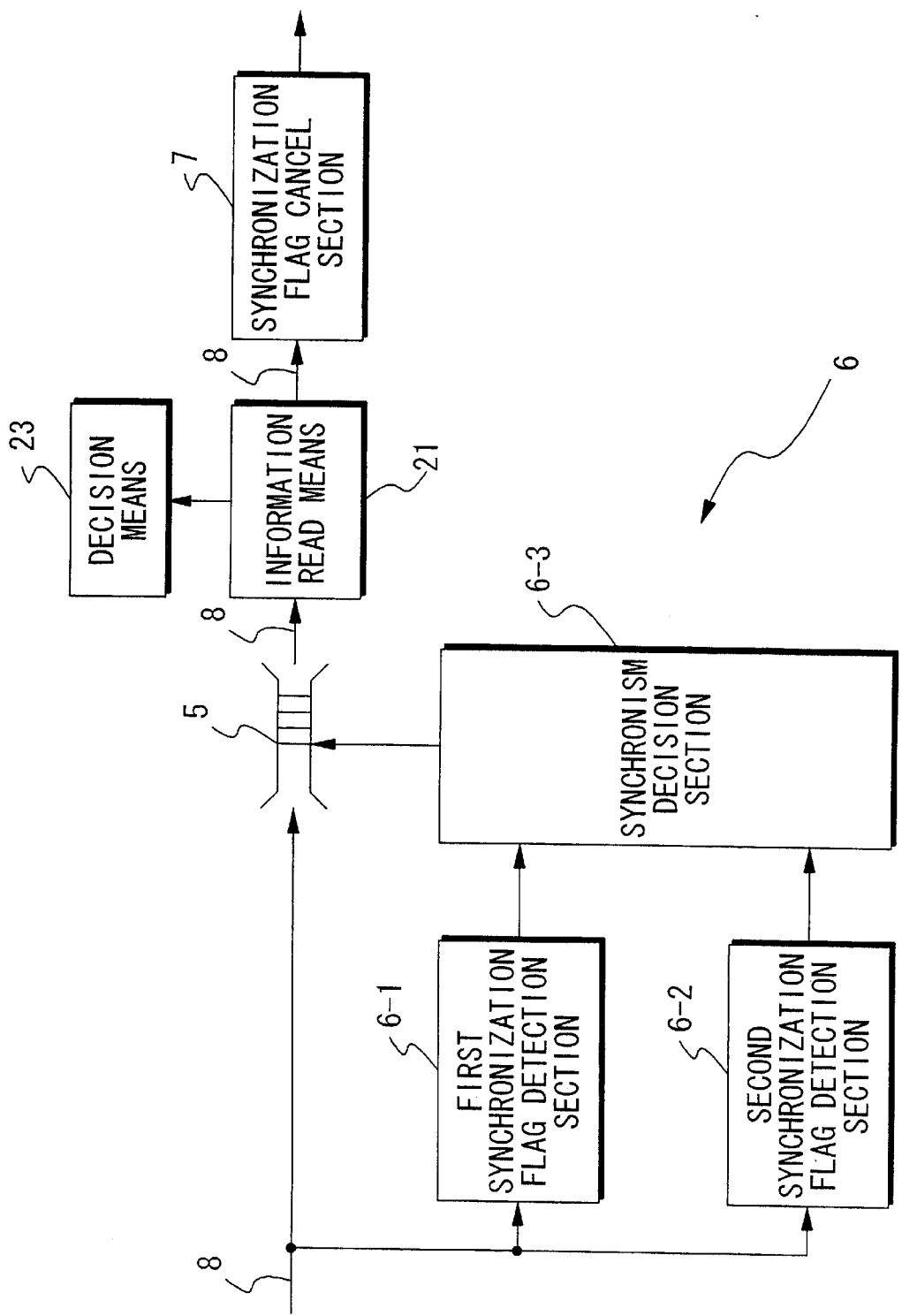
FIG. 14 is a block diagram showing the structure of the variable length frame receiver of the fourth embodiment.

FIG. 14 is a block diagram showing a structure of the receiver of this embodiment.

The receiver is constituted by adding decision means 23 to the receiver (FIG. 11) of the third embodiment.

Information read means 21 reads identification code strings (additional information M of the third embodiment) present immediately after the synchronization flags $S_1$ and $S_2$ of a variable length frame F' read out of the buffer 5.

The decision means 23 is means for deciding whether or not the identification code strings read by the information read means 21 is the identification code string $E_1$ or $E_2$.

The decision result by the decision means 23 is used for the synchronism establishment according to a method different from the synchronism establishment according to the above-described synchronization flags. Because other structures are the same as those of the third embodiment, their description is omitted.

(2) Operations of This Embodiment

Then, operations of this embodiment are described below.

When the code strings $f_1'$ and $f_2'$ corresponding to a certain variable length frame F are output from synchronization flag addition sections 3-1 and 3-2 of the transmitter, for example, the first encoding section 22-1 of the conversion means 22 operates to encode an additional information M into an identification code string $E_1$.

The information addition means 20 generates a code string $f_1''$ by adding the identification code string $E_1$ at a position immediately after the synchronization flag $S_1$ in the code string $f_1'$. Furthermore, the information addition means 20 generates a code string $f_2''$ by adding the identification code string $E_1$ at a position immediately after the synchronization flag $S_2$ in the code string $f_2$. Thus, the code strings $f_1''$ and $f_2''$ including the identification code string $E_1$ are generated and supplied to the transmission section as the variable length frame F'.

Thereafter, when a variable length frame F following to the above variable length frame F is transmitted, the second encoding section 22-2 of the conversion means 22 operates to encode an additional information M into an identification code string $E_2$.

The information addition means 20 then generates the code string $f_1''$ by adding the identification code string $E_2$ at a position immediately after the synchronization flag $S_1$ in the code string $f_1'$ and moreover, generates the code string $f_2''$ by adding the identification code string $E_2$ to a position immediately after the synchronization flag $S_2$ in the code string $f_2$. Thus, the code strings $f_1''$ and $f_2''$ including the identification code string $E_2$ are generated and supplied to the transmission section as the variable length frame F'.

Serial data constituted with a series of variable length frames F' generated as described above are transmitted from the transmission section to the receiver.

The serial data is received by the reception section of the receiver and stored in the buffer 5. Then, the same synchronism establishment operation as the case of the first embodiment is performed by the synchronism decision section 6-3. As a result, the variable length frame F' is read out of the buffer 5. The identification code strings immediately after the synchronization flags $S_1$ and $S_2$ of the variable length frame F' are then read by the information read means 21.

The decision means 23 then identifies whether the identification code strings read by the information read means 21 is the identification code string $E_1$ or $E_2$ and decides whether or not two identification code strings read out of one variable length frame F' are the same. The decision result by the decision means 23 is used for the synchronism establishment according to a method different from the synchronism establishment according to the above synchronization flags.

Next, the synchronism establishment operation of the variable length frame F' using the decision result by the decision means 23 is described below by referring to FIG. 15.

Figure 15:
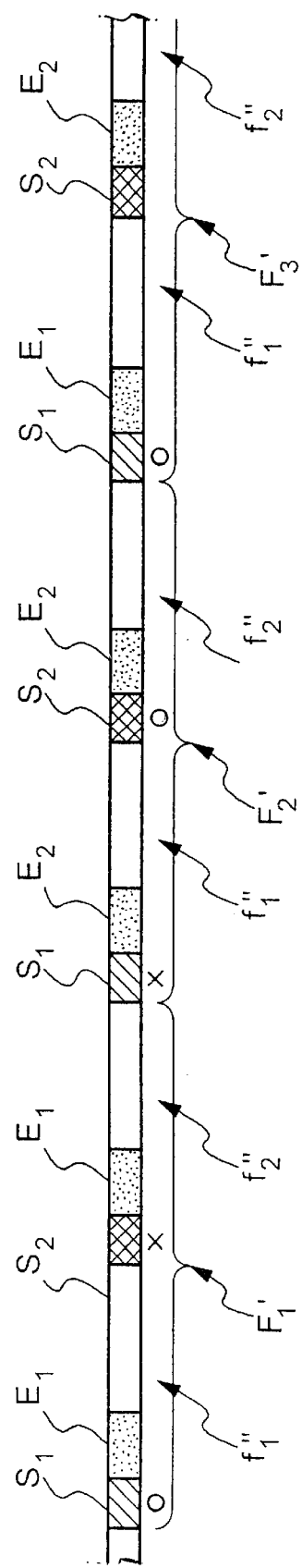
FIG. 15 is an illustration showing a variable length frame generated by the transmitter of the fourth embodiment.

FIG. 15 illustrates the serial data stored in the buffer 5. In the case of the example shown in FIG. 15, the serial data includes consecutive variable length frames $F_1'$, $F_2'$, and $F_3'$.

As described in the first embodiment, when the receiver can detect two out of three consecutive synchronization flags in the received serial data, it is possible for the receiver to decide the start points of the variable length frames F'. However, when two consecutive synchronization flags are not detected, it is impossible to decide the start points of the variable length frames F'.

In the case of the example shown in FIG. 15, the synchronization flag $S_2$ in the variable length frame $F_1'$ and the synchronization flag $S_1$ in the next variable length frame $F_2'$ are not normally received.

However, the receiver successively detects the synchronization flag $S_1$ of the variable length frame $F_1'$ and the synchronization flag $S_2$ of the variable length frame $F_2'$ in a regular order. Therefore, the synchronism decision section 6-3 erroneously recognizes these synchronization flags $S_1$ and $S_2$ as those included in the same variable length frame $F_1'$ and decides the start point of the variable length frame $F_3'$ based on the detected positions of the synchronization flags $S_1$ and $S_2$. As a matter of course, the decision of the start point of the variable length frame $F_3'$ results in fail.

This embodiment makes it possible to avoid the fail of the decision of the start point using with the decision result by the decision means 23.

That is, in this embodiment, identification code strings immediately after synchronization flags read out of one variable length frame F' are compared each other and it is decided whether or not the encoding methods of the both match with each other.

When two identification code strings do not match with each other, it is understood that these identification code strings and the synchronization flags immediately before the strings are obtained from two different variable length frames.

For example, in FIG. 15, the synchronization flag $S_1$ of the variable length frame $F_1'$ and the synchronization flag $S_2$ of the variable length frame $F_2'$ are sequentially detected in the receiver. However, the method for encoding the identification code string $E_1$ following to the synchronization flag $S_1$ is different from the method for encoding the identification code string $E_2$ following to the synchronization flag $S_2$. Therefore, it is clarified that the synchronization flag $S_1$ and the synchronization flag $S_2$ are included in variable length frames different from each other.

When the synchronization flags $S_1$ and $S_2$ included in variable length frames different from each other are used, it is impossible to decide the start point of a following variable length frame (variable length frame $F_3'$ in the case of the example shown in FIG. 15).

Therefore, when it is decided by the decision means 23 that the methods for encoding identification code are mismatched each other, the detection of the synchronization flag of the following variable length frame (variable length fame $F_3'$ in the case of the example shown in FIG. 15) is waited without deciding the start point of the following variable length frame based on the detected positions of the synchronization flags $S_1$ and $S_2$.

When the synchronization flag $S_1$ of the variable length frame $F_3'$ in FIG. 15, for example, is normally detected by the receiver, it is possible to decide the start point of the variable length frame $F_2'$ based on the detected position of the synchronization flag $S_1$ of the variable length frame $F_3'$ and that of the synchronization flag $S_2$ of the variable length frame $f_2'$.

As described above, this embodiment makes it possible to improve the accuracy of the synchronism establishment of variable length frame F' because an identification code string following a synchronization flag also serves as the information for synchronism establishment.

(3) Modifications of This Embodiment

The following modifications are considered for this embodiment.

<1> In the above embodiment, bits "0" and "1" are added to the head of the additional information M to form the identification code strings $E_1$ and $E_2$. However, it is also possible to use other method as long as encoding is recognizably performed.

<2> In the above embodiment, two types of methods for encoding the information M are used. It is also possible to use three or more types of methods for encoding the information M. In this case, it is necessary to provide encoding sections equal to the number of types of encoding methods, and to provide control means for selecting an output from each encoding section to the information addition means 20, and to properly select a code string by the control means and output it to the information addition means 20 so that code strings having a same expression format are not added to two adjacent variable length frames out of a series of variable length frames to be transmitted.

What is claimed is:

1. A variable length frame transmission method comprising the steps of:
   dividing at a transmitter a variable length frame to be transmitted into at least two substantially independent code strings according to a certain division rule;
   adding a different synchronization flag to each of the code strings;
   transmitting from the transmitter serial data constituted of the code strings and the synchronization flag added to the code strings;
   receiving at a receiver the serial data;
   detecting at the receiver the synchronization flags out of the serial data;
   determining a start point of a variable length frame in the serial data based on the detected positions of at least two different synchronization flags in the serial data; and
   fetching the variable length frame from the serial data based on the determined result.

2. The variable length frame transmission method according to claim 1, wherein;
   the transmitter divides the variable length frame into two code strings having a length ratio of a:b and adds first and second synchronization flags having contents different from each other to each of two code strings; and
   the receiver decides a position of the first synchronization flag as the start point of a variable length frame and moreover, decides the start point of a variable length frame following to the variable length frame based on positions of the first and second synchronization flags when successively detecting the first and second synchronization flags out of the serial data;
   decides a position of the first synchronization flag as the start point of a variable length frame and moreover, decides the start point of a variable length frame followed by the variable length frame based on a position of the first synchronization flag and a position of the second synchronization flag immediately before the position of the first synchronization flag when detecting the two consecutive second synchronization flag out of the serial data and thereafter, detecting the first synchronization flag; and
   decides positions of the first synchronization flags as the start points of two consecutive variable length frames when consecutively detecting the two first synchronization flag out of the serial data.

3. The variable length frame transmission method according to claim 1, wherein
   the transmitter divides the variable length frame into two code strings having a length ratio of 1:1;
   adds a first synchronization flag to the head of the former one of the two code strings; and
   adds a second synchronization flag having a content different from that of the first synchronization flag but having the same length as the first synchronization flag to the head of the latter one of the two code strings; and
   the receiver decides a position of the first synchronization flag as the staff point of a variable length frame and moreover, decides a position which is advanced from a position of the first synchronization flag by a distance between the position of the first synchronization flag and a position of the second synchronization flag as the start point of a variable length frame following to the former variable length frame when successively detecting the first and second synchronization flags out of the serial data;
   decides a position of the first synchronization flag as the start point of a variable length frame and moreover, decides the start point of a variable length frame followed by the former variable length franc based on a position of the first synchronization flag and that of the second synchronization flag immediately before the position of the fist synchronization flag when detecting the two consecutive second synchronization flag out of the serial data and thereafter detecting the first synchronization flag; and
   decides positions of two consecutive first synchronization flags as the start point of a variable length frame when detecting the two consecutive first synchronization flags out of the serial data.

4. The variable length frame transmission method according to claim 1, wherein
   the transmitter divides the variable length frame into three or more code strings and adds different synchronization flags to the code strings, and
   the receiver decides the start point of a variable length frame having the synchronization flags based on the detected position of each synchronization flag.

5. The variable length frame transmission method according to claim 1, wherein
   the transmitter adds additional information including information concerned with the structure of the variable length frame after the synchronization flags and transmits the serial data.

6. The variable length fame transmission method according to claim 5, wherein
   the transmitter adds error detection codes of the synchronization flags to the additional information, and
   the receiver performs error detection using with the error detection codes obtained from the serial data and uses the error detection result for detection of the synchronization flags.

7. The variable length frame transmission method according to claim 6, wherein
   the transmitter encodes the additional information including the information concerned with the structure of the variable length frame to generate identification code strings by encoding methods different between the consecutive variable length frames and adds the identification code strings after the synchronization flags to transmit the serial data, and
   the receiver detects the synchronization flags and the identification code strings out of the serial data, compares the identification code strings detected together with the synchronization flags to judge whether or not the synchronization flags are included in one variable length frame.

8. A variable length frame transmitter comprising:
   variable length frame division means for dividing a variable length frame to be transmitted into at least two substantially independent code strings according to a certain division rule;
   addition means for adding different synchronization flags to each of the code strings divided by the variable length frame division means; and
   output means for constituting a variable length frame having synchronization flags using at least two code strings to which the synchronization flags are added by the addition means and for outputting serial data constituted of a plurality of variable length frames having synchronization flags.

9. The variable length frame transmitter according to claim 8, wherein the variable length frame division means is division means for dividing a variable length frame into two code strings.

10. The variable length frame transmitter according to claim 9, wherein the variable length frame division means is division means for dividing a variable length frame into code stings having a length ratio of 1:1.

11. The variable length frame transmitter according to claim 8, wherein the synchronization flag addition means is constituted of synchronization flag addition sections equal to the number of the divided variable length frames and these synchronization flag addition sections add unique synchronization flags to the heads of the code strings.

12. The variable length frame transmitter according to claim 8, further comprising information addition means for adding additional information including the information concerned with the structure of the variable length frame after the synchronization flags.

13. The variable length frame transmitter of claim 8, further comprising:

conversion means for encoding additional information including information concerned with structure of a variable length frame to output identification code strings and encoding the additional information by encoding methods different between consecutive variable length frames; and information addition means for adding the identification code strings after the synchronization flags.

14. A variable length frame receiver comprising:

a buffer for storing received serial data;

wherein the receive serial data includes a plurality of synchronization flag;

wherein the received serial data includes one or more variable-length frames;

wherein each of the one or more variable-length frames has a start point;

detection means for detecting a plurality of synchronization flags out of the serial data;

synchronism decision means for determining a start point of a variable length frame included in the serial data based on positions of at least two synchronization flags detected from the serial data by the detection means;

wherein the at least two synchronization flag detected from the serial data include a first synchronization flag and a second synchronization flap; and reproduction means for fetching a variable length frame after the start point out of the serial data stored in the buffer.

15. The variable length frame receiver according to claim 14, wherein the detection means is constituted of synchronization flag detection sections equal to the number of the divided variable length frames and the synchronization flag detection sections respectively detect unique synchronization flags corresponding to themselves out of the serial data.

16. The variable length frame receiver according to claim 14, wherein the receiver reads additional information following to the synchronization flags out of the serial data and obtains the information concerned with structure of a variable length frame from the additional information.

17. The variable length frame receiver according to claim 14, wherein the receiver reads additional information following to the synchronization flags out of the serial data and detects errors in the additional information using with error detection codes included in the additional information and uses the error detection result for detection of the synchronization flags.

18. The variable length frame receive according to claim 14, wherein the receiver reads identification code strings following to the synchronization flags out of the serial data and compares the identification code strings each other to decide whether or not the synchronization flags followed by the identification code strings correspond to the same variable length frame.

* * * * *

UNITED STATES PATENT AND TRADEMARK OFFICE
CERTIFICATE OF CORRECTION

PATENT NO. : 6,744,784 B1  
DATED : June 1, 2004  
INVENTOR(S) : Nobuhiko Naka et al.

Page 1 of 1

It is certified that error appears in the above-identified patent and that said Letters Patent is hereby corrected as shown below:

<u>Title page,</u>  
Item [56], References Cited, U.S. PATENT DOCUMENTS,  
insert the following:  
-- 5,537,422    7/1996        Shimpuku et al.  
   5,570,362    10/1996       Nishimura  
   5,798,804    8/1998        Okitsu --.  
FOREIGN PATENT DOCUMENTS,  
insert the following:  
-- JP    8-22357, A       1/1996  
   JP    8-223572, A      8/1996 --.  
Item [57], ABSTRACT,  
Line 4, delete blank line.

<u>Column 24,</u>  
Line 7, after "variable length" delete "franc" and substitute -- frame --.  
Line 32, after "variable length" delete "fame" and substitute -- frame --.

<u>Column 25,</u>  
Line 37, after "synchronization" delete "flag;" and substitute -- flags; --.

<u>Column 26,</u>  
Line 10, after "synchronization" delete "flap;" and substitute -- flag; --.

Signed and Sealed this

Ninth Day of May, 2006

JON W. DUDAS  
*Director of the United States Patent and Trademark Office*